United States Patent
Kim et al.

(10) Patent No.: US 10,602,537 B2
(45) Date of Patent: Mar. 24, 2020

(54) METHOD AND USER EQUIPMENT FOR RECEIVING DOWNLINK CHANNEL, AND METHOD AND BASE STATION FOR TRANSMITTING DOWNLINK CHANNEL

(71) Applicant: LG ELECTRONICS INC., Seoul (KR)

(72) Inventors: Eunsun Kim, Seoul (KR); Seonwook Kim, Seoul (KR); Kijun Kim, Seoul (KR); Suckchel Yang, Seoul (KR); Hanbyul Seo, Seoul (KR); Yunjung Yi, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/772,746

(22) PCT Filed: Nov. 1, 2016

(86) PCT No.: PCT/KR2016/012470
§ 371 (c)(1),
(2) Date: May 1, 2018

(87) PCT Pub. No.: WO2017/078372
PCT Pub. Date: May 11, 2017

(65) Prior Publication Data
US 2019/0223204 A1 Jul. 18, 2019

Related U.S. Application Data

(60) Provisional application No. 62/249,865, filed on Nov. 2, 2015, provisional application No. 62/252,410, filed
(Continued)

(51) Int. Cl.
*H04W 72/12* (2009.01)
*H04B 1/00* (2006.01)
(Continued)

(52) U.S. Cl.
CPC .......... *H04W 72/1289* (2013.01); *H04B 1/00* (2013.01); *H04L 1/18* (2013.01);
(Continued)

(58) Field of Classification Search
CPC ........... H04W 72/1289; H04W 72/042; H04W 72/1273; H04W 72/14; H04L 5/0055;
(Continued)

(56) References Cited

U.S. PATENT DOCUMENTS

2014/0071954 A1 3/2014 Au et al.
2015/0009953 A1* 1/2015 Park .................. H04W 72/1273
370/330
(Continued)

FOREIGN PATENT DOCUMENTS

WO WO 2015/094914 A1 6/2015

*Primary Examiner* — Duc C Ho
(74) *Attorney, Agent, or Firm* — Dentons US LLP

(57) ABSTRACT

According to the present invention, a first physical downlink control channel (PDCCH) and a second PDCCH can be transmitted to user equipment. A first physical downlink data channel (PDSCH) corresponding to the first PDCCH, and a second PDSCH corresponding to the second PDCCH can be transmitted to the user equipment. When the first PDSCH has a lower decoding priority than the second PDSCH, and the decoding timing of the first PDSCH and the decoding timing of the second PDSCH overlap, the user device may decode the second PDSCH and not the first PDSCH at the decoding timing, and transmit information with respect to the first PDSCH as first ACK/NACK information. As a reply to the first ACK/NACK information, a third PDCCH not having a corresponding PDSCH may be transmitted to the user equipment.

15 Claims, 14 Drawing Sheets

Related U.S. Application Data on Nov. 6, 2015, provisional application No. 62/256,655, filed on Nov. 17, 2015, provisional application No. 62/387,401, filed on Dec. 24, 2015.

(51) Int. Cl.
*H04L 1/18* (2006.01)
*H04L 5/00* (2006.01)
*H04W 72/04* (2009.01)
*H04W 72/14* (2009.01)

(52) U.S. Cl.
CPC .......... *H04L 5/0044* (2013.01); *H04L 5/0053* (2013.01); *H04L 5/0055* (2013.01); *H04W 72/042* (2013.01); *H04W 72/1273* (2013.01); *H04W 72/14* (2013.01)

(58) Field of Classification Search
CPC ....... H04L 1/18; H04L 5/0044; H04L 5/0053; H04B 1/00
See application file for complete search history.

(56) References Cited

U.S. PATENT DOCUMENTS

| | | |
|---|---|---|
| 2015/0181575 A1 | 6/2015 | Ng et al. |
| 2015/0200761 A1 | 7/2015 | Kim et al. |
| 2015/0245323 A1 | 8/2015 | You et al. |
| 2018/0167980 A1* | 6/2018 | Shi ........................ H04W 72/02 |

* cited by examiner

METHOD AND USER EQUIPMENT FOR RECEIVING DOWNLINK CHANNEL, AND METHOD AND BASE STATION FOR TRANSMITTING DOWNLINK CHANNEL

CROSS REFERENCE TO RELATED APPLICATIONS

This application is the National Phase of PCT International Application No. PCT/KR2016/012470, filed on Nov. 1, 2016, which claims priority under 35 U.S.C. 119(e) to U.S. Provisional Application No. 62/249,865, filed on Nov. 2, 2015, No. 62/252,410, filed on Nov. 6, 2015, No. 62/256,655, filed on Nov. 17, 2015, and No. 62/387,401, filed on Dec. 24, 2015, all of which are hereby expressly incorporated by reference into the present application.

TECHNICAL FIELD

The present invention relates to a wireless communication system and, more particularly, to a method for transmitting or receiving downlink channel and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Further, along with the technology development, a delay or overcoming a delay has emerged as an important issue. The performances of more and more applications depend on a delay/latency. Accordingly, there is a need for a method for reducing a delay/latency, compared to a legacy system.

The technical objects that can be achieved through the present invention are not limited to what has been particularly described hereinabove and other technical objects not described herein will be more clearly understood by persons skilled in the art from the following detailed description.

Technical Solution

In one aspect of the present invention, a method for receiving a downlink channel in a user equipment of a wireless communication system is provided. The method comprises receiving a first physical downlink control channel (PDCCH) and a second PDCCH; receiving a first physical downlink data channel (PDSCH) corresponding to the first PDCCH and a second PDSCH corresponding to the second PDCCH; decoding the second PDSCH not the first PDSCH when the first PDSCH has a lower decoding priority than the second PDSCH and a decoding timing of the first PDSCH is overlapped with a decoding timing of the second PDSCH; transmitting NACK as first ACK/NACK information for the first PDSCH; and receiving a third PDCCH having no corresponding PDSCH in response to the first ACK/NACK information.

In another aspect of the present invention, a user equipment for receiving a downlink channel in a wireless communication system is provided. The user equipment comprises a radio frequency (RF) unit; and a processor configured to control the RF unit. The processor is configured to control the RF unit to receive a first physical downlink control channel (PDCCH) and a second PDCCH, control the RF unit to receive a first physical downlink data channel (PDSCH) corresponding to the first PDCCH and a second PDSCH corresponding to the second PDCCH, control the RF unit to decode the second PDSCH not the first PDSCH when the first PDSCH has a lower decoding priority than the second PDSCH and a decoding timing of the first PDSCH is overlapped with a decoding timing of the second PDSCH, control the RF unit to transmit NACK as first ACK/NACK information for the first PDSCH, and control the RF unit to receive a third PDCCH having no corresponding PDSCH in response to the first ACK/NACK information.

In still another aspect of the present invention, a method for transmitting a downlink channel from a base station to a user equipment in a wireless communication system is provided. The method comprises transmitting a first physical downlink control channel (PDCCH) and a second PDCCH; transmitting a first physical downlink data channel (PDSCH)

corresponding to the first PDCCH and a second PDSCH corresponding to the second PDCCH; receiving first ACK/NACK information for the first PDSCH at an ACK/NACK timing associated with the first PDCCH; and transmitting third PDCCH having no corresponding PDSCH in response to the first ACK/NACK information when the first PDSCH has a lower decoding priority than the second PDSCH, a decoding timing of the first PDSCH is overlapped with a decoding timing of the second PDSCH, and the first ACK/NACK information is NACK.

In further still another aspect of the present invention, a base station for transmitting a downlink channel to a user equipment in a wireless communication system is provided. The base station comprises a radio frequency (RF) unit; and a processor configured to control the RF unit, wherein the processor is configured to control the RF unit to transmit a first physical downlink control channel (PDCCH) and a second PDCCH, control the RF unit to transmit a first physical downlink data channel (PDSCH) corresponding to the first PDCCH and a second PDSCH corresponding to the second PDCCH, control the RF unit to receive first ACK/NACK information for the first PDSCH at an ACK/NACK timing associated with the first PDCCH, and control the RF unit to transmit third PDCCH having no corresponding PDSCH in response to the first ACK/NACK information when the first PDSCH has a lower decoding priority than the second PDSCH, a decoding timing of the first PDSCH is overlapped with a decoding timing of the second PDSCH, and the first ACK/NACK information is NACK.

In each aspect of the present invention, the first PDSCH may be transmitted to the user equipment in accordance with a first transmission time interval (TTI) of a first TTI length, and the second PDSCH may be transmitted to the user equipment in accordance with a second TTI of a second TTI length shorter than the first TTI length.

In each aspect of the present invention, if the user equipment should decoding of the second PDSCH in the middle of decoding the first PDSCH, the UE may stop decoding of the first PDSCH and set the first ACK/NACK information to NACK. The user equipment may resume decoding of the first PDSCH after decoding of the second PDSCH is completed. The user equipment may transmit ACK or NACK as third ACK/NACK information for the first PDSCH at an ACK/NACK timing associated with the third PDCCH in accordance with the decoding result of the first PDSCH.

In each aspect of the present invention, the third ACK/NACK information may be transmitted using a physical uplink control channel (PUCCH) resource determined based on a lowest control channel element (CCE) index of the third PDCCH.

In each aspect of the present invention, the third PDCCH may carry downlink control information, which includes the same scheduling information as scheduling information carried by the first PDCCH, or downlink control information having no scheduling information.

In each aspect of the present invention, the user equipment may transmit ACK or NACK as second ACK/NACK information for the second PDSCH in accordance with the decoding result of the second PDSCH. The base station may transmit a PDCCH for retransmission of the second PDSCH or a PDCCH for new downlink data to the user equipment at a retransmission grant timing for the second PDSCH in accordance with the second ACK/NACK information.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a wireless communication system is improved.

According to an embodiment of the present disclosure, a delay/latency may be reduced during communication between a UE and a BS.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
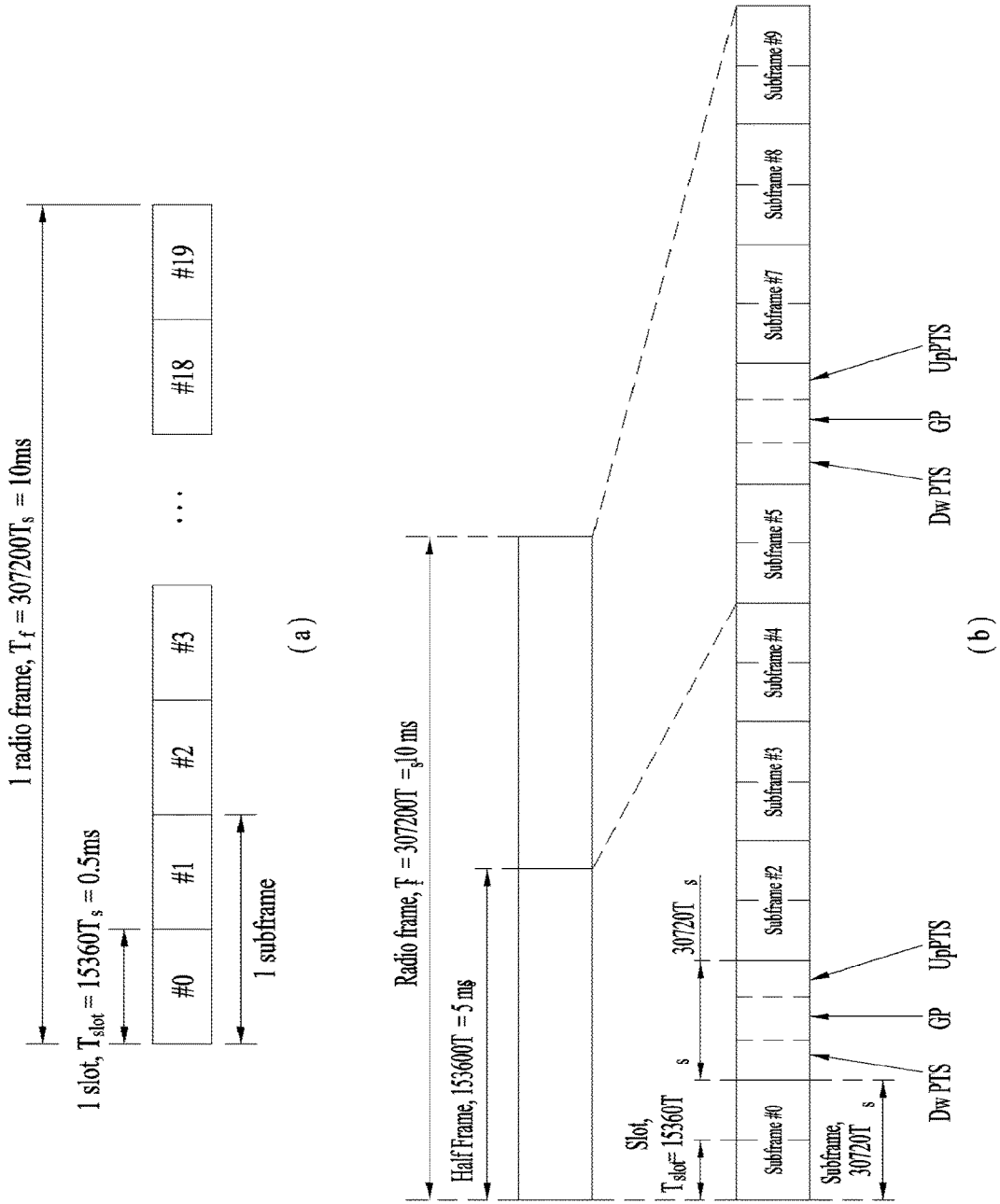
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

Among the terms and technologies used in the present invention, for the terms and technologies which are not described in detail, refer to 3GPP LTE/LTE-A standard documents, for example, 3GPP TS 36.211, 3GPP TS 36.212, 3GPP TS 36.213, 3GPP TS 36.321 and 3GPP TS 36.331.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms ($307{,}200T_s$) in duration. The radio frame is divided into 10 subframes of equal size. Subframe numbers may be assigned to the 10 subframes within one radio frame, respectively. Here, $T_s$ denotes sampling time where $T_s = 1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

TTI means an interval where data may be scheduled. For example, referring to FIGS. 1 and 3, transmission occasion of UL grant or DL grant in the current LTE/LTE-A system exists per 1 ms, and UL/DL grant does not exist several times within a time shorter than 1 ms. Therefore, in the current LTE/LTE-A system, TTI is 1 ms.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| | | Normal | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | — | — |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
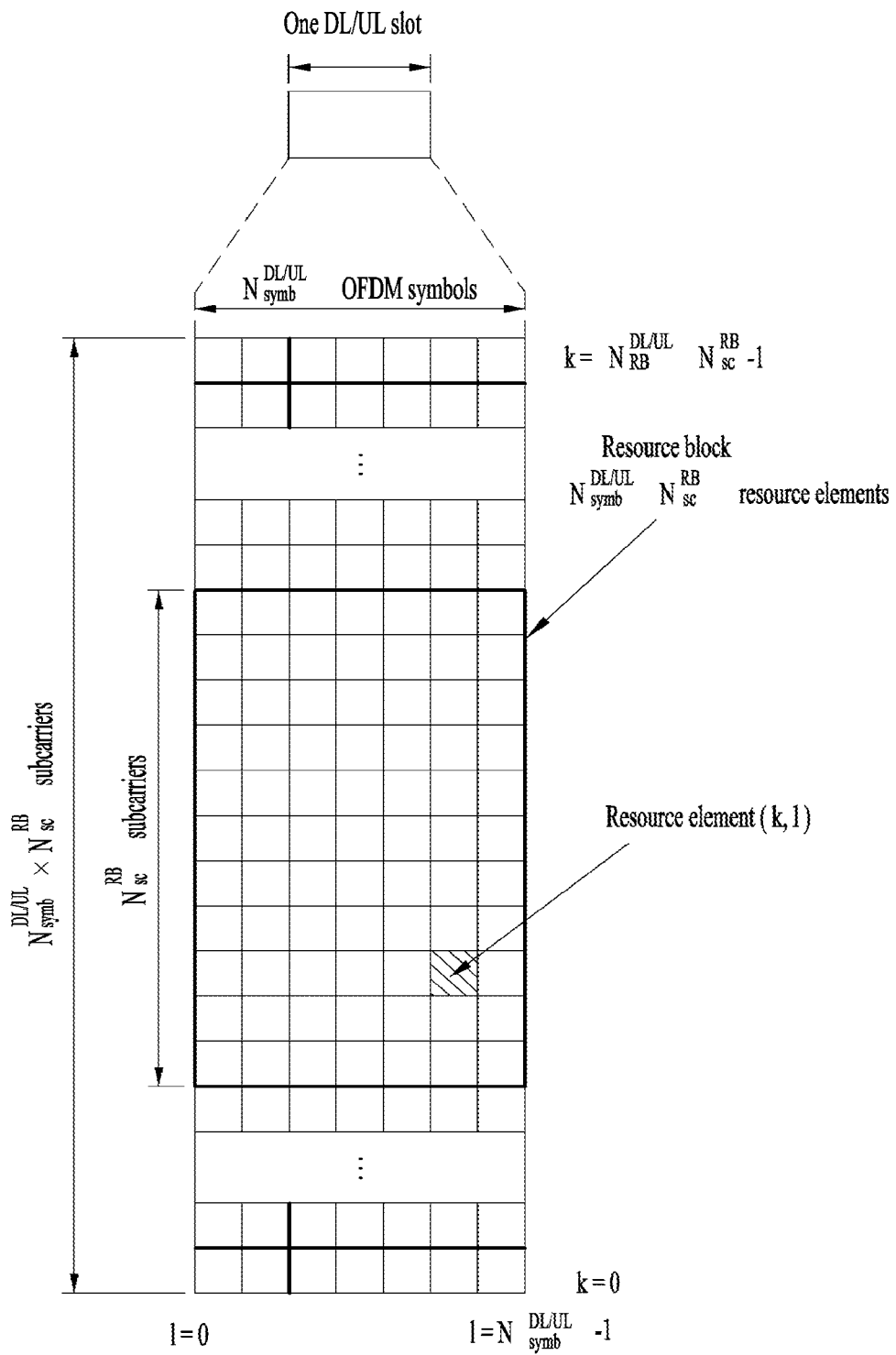
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and NULRB denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/DL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as NDL/ULsymb (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/DL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/DL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
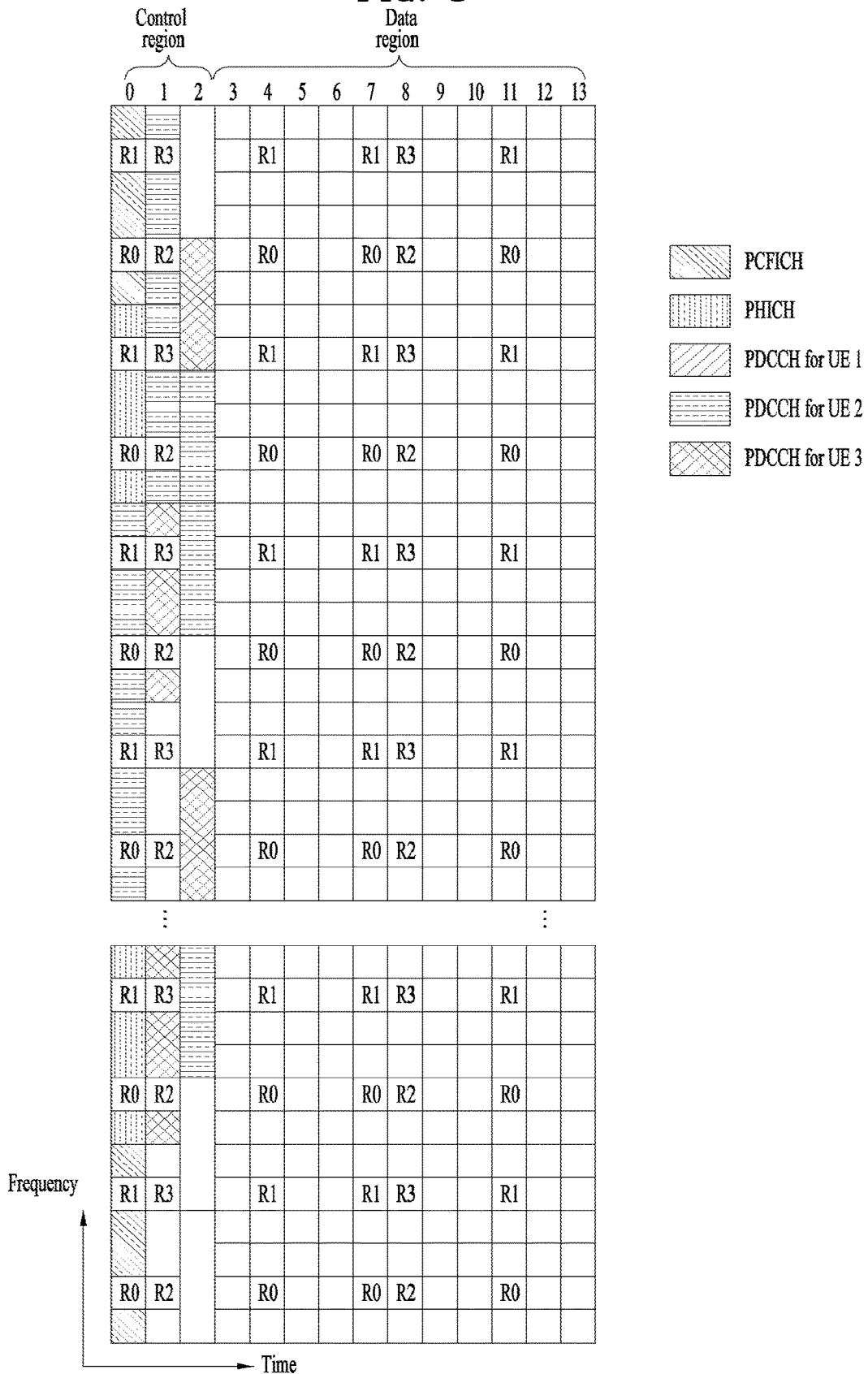
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

PHICH resource is identified by a pair of indexes ($n^{group}_{PHICH}$, $n^{seq}_{PHICH}$) $n^{group}_{PHICH}$ is a PHICH group number and $n^{seq}_{PHICH}$ is an orthogonal sequence index within the group, and the indexes are defined as follows.

$$n^{group}_{PHICH} = (I_{PRB\_RA} + n_{DMRS}) \bmod N^{group}_{PHICH} + I_{PHICH} N^{group}_{PHICH}$$

$$n^{seq}_{PHICH} = (\lfloor I_{PRB\_RA}/N^{group}_{PHICH} \rfloor + n_{DMRS}) \bmod 2N^{PHICH}_{SF}$$

Equation 1

In this case, $N^{PHICH}_{SF}$ is a spreading factor size used for PHICH modulation. When the number of negatively acknowledged transport blocks (TBs) is not the same as the number of TBs indicated within the latest PDCCH associated with the corresponding PUSCH, $I_{PRB\_RA} = I^{lowest\_index}_{PRB\_RA}$ with respect to a first TB of PUSCH having an associated PDCCH or a case that there is no associated PDCCH. $I_{PRB\_RA} = I^{lowest\_index}_{PRB\_RA}$ is obtained with respect to a second TB of PUSCH having an associated PDCCH. In this case, $I^{lowest\_index}_{PRB\_RA}$ is the lowest PRB index within a first slot of corresponding PUSCH transmission. $n^{group}_{PHICH}$ is the number of PHICH groups, and is configured by a higher layer. At a subframe n=4 or 9, $I_{PHICH}=1$ is obtained for TDD UL/DL configuration having PUSCH transmission, and $I_{PHICH}=0$ is obtained for the other case. $n_{DMRS}$ is mapped from cyclic shift for DMRS field within the most recent PDCCH having a UL DCI format for transport block(s) associated with the corresponding PUSCH transmission in accordance with Table 4. If initial PUSCH for the same transport block is scheduled semi-persistently or by a random access response grant in a state that there is no PDCCH having a UL DCI format for the same transport block, $n_{DMRS}$ is set to 0.

TABLE 4

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes 9 REGs, which are distributed over first 1/2/3 (4 if necessary for 1.4 MHz) OFDM symbols and system bandwidth through interleaving to enable diversity and attenuate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in a system is numbered from 0 to $N_{CCE}-1$, where $N_{CCE}=\text{floor}(N_{REG}/9)$, where $N_{REG}$ is the number of REGs not allocated to the PCFICH or the PHICH.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as a search space (SS). SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SSs.

TABLE 5

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 4:
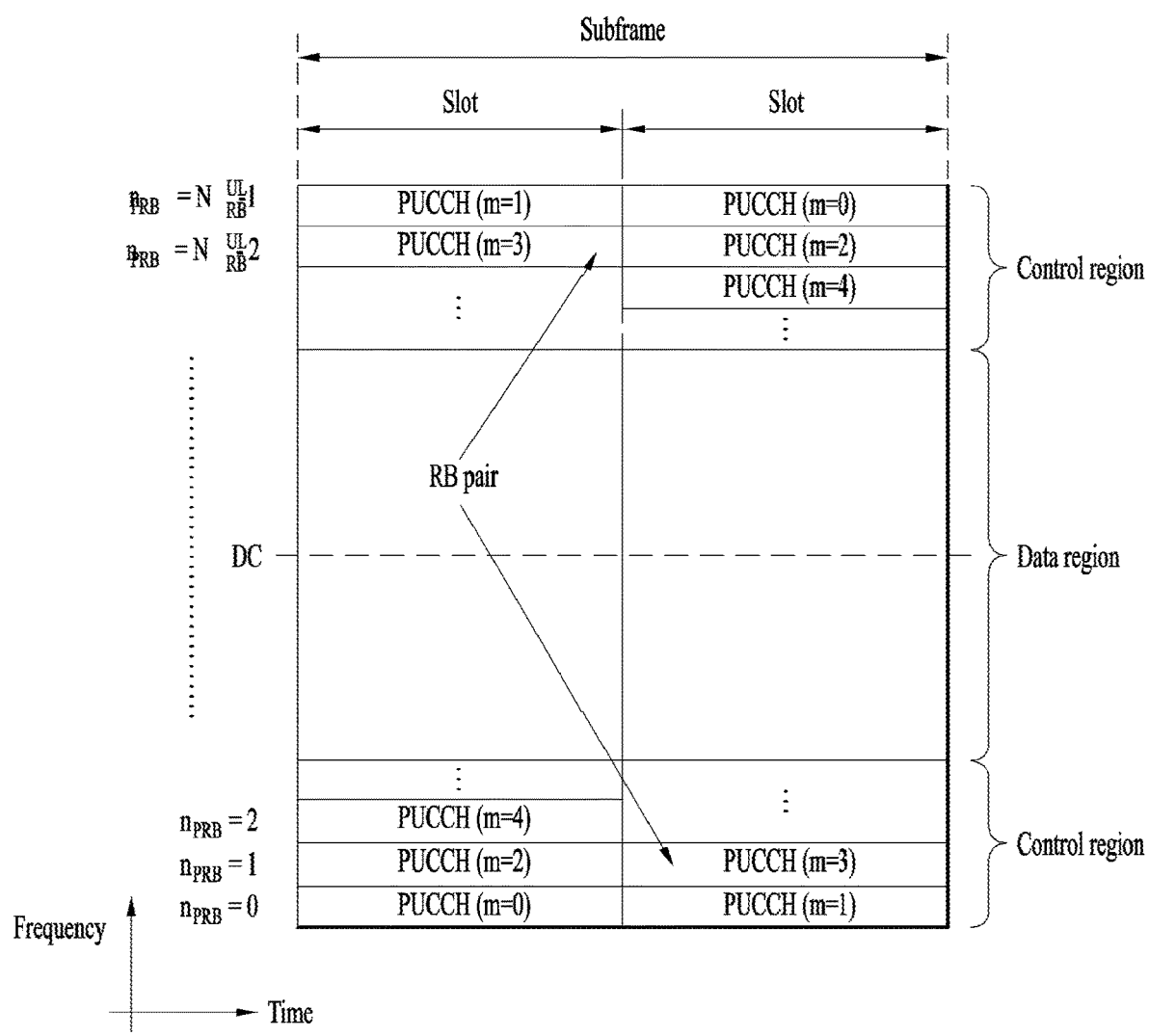
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Various PUCCH formats for UCI transmission may be used. A size and usage of UCI carried by one PUCCH are varied depending on a PUCCH format, and the size of the UCI may be varied depending on a coding rate. The following Table illustrates a mapping relation between the PUCCH format and UCI.

For example, the PUCCH format may be defined as follows.

TABLE 6

| PUCCH format | Modulation scheme | Number of bits per subframe | Usage | Etc. |
|---|---|---|---|---|
| 1 | N/A | N/A (exist or absent) | SR (Scheduling Request) | |

TABLE 6-continued

| PUCCH format | Modulation scheme | Number of bits per subframe | Usage | Etc. |
|---|---|---|---|---|
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to the above Table, PUCCH format 1 is mainly used to transmit ACK/NACK information, PUCCH format 2 is mainly used to carry channel state information (CSI) such as CQI/PMI/RI, and PUCCH format 3 is mainly used to transmit ACK/NACK information.

The UE is allocated a PUCCH resource for transmission of UCI from an eNB by a higher layer signal, a dynamic control signal, or in an implicit manner. The physical resources used for PUCCH depends on two parameters, $N^{(2)}_{RB}$ and $N^{(1)}_{cs}$, given by higher layers. Variable $N^{(2)}_{RB} \geq 0$ denotes the bandwidth available for PUCCH format 2/2a/2b transmission in each slot, expressed as an integer multiple of $N^{RB}_{sc}$. The variable $N^{(1)}_{cs}$ denotes the number of cyclic shift used for PUCCH formats 1/1a/1b in a resource block used for a mix of formats 1/1a/1b and 2/2a/2b. The value of $N^{(1)}_{sc}$ is an integer multiple of $\Delta^{PUCCH}_{shift}$ within the range of $\{0, 1, \ldots, 7\}$, $\Delta^{PUCCH}_{shift}$ is provided by higher layers. No mixed resource block is present if $N^{(1)}_{cs}=0$. At most one resource block in each slot supports a mix of formats 1/1a/1b and 2/2a/2b. Resources used for transmission of PUCCH formats 1/1a/1b, 2/2a/2b and 3 are represented by the non-negative indices $n^{(1,p)}_{PUCCH}$, $n^{(2,p)}_{PUCCH} < N^{(2)}_{RB} \cdot N^{RB}_{sc} + \text{ceil}(N^{(1)}_{cs}/8) \cdot (N^{RB}_{sc} - N^{(1)}_{cs} - 2)$, and $n^{(3,p)}_{PUCCH}$, respectively.

Specifically, an orthogonal sequence and/or a cyclic shift to be applied to corresponding UCI is determined from a PUCCH resource index according to a specific rule predefined for each PUCCH format, and resource indexes of two resource blocks in a subframe to which a PUCCH is mapped are given. For example, the PRBs to be used for transmission of PUCCH in ns are given by the following equation.

$$n_{PRB} = \begin{cases} \lfloor \frac{m}{2} \rfloor & \text{if } (m+n_s \bmod 2) \bmod 2 = 0 \\ N^{UL}_{RB} - 1 - \lfloor \frac{m}{2} \rfloor & \text{if } (m+n_s \bmod 2) \bmod 2 = 1 \end{cases} \quad \text{Equation 2}$$

where the variable m depends on the PUCCH format. PUCCH format 1/1a/1b, PUCCH format 2/2a/2b, and PUCCH format 3 are given by Equation 3, Equation 4 and Equation 5, respectively.

$$m = \begin{cases} N^{(2)}_{RB} & \text{if } n^{(1,p)}_{PUCCH} < c \cdot N^{(1)}_{cs}/\Delta^{PUCCH}_{shift} \\ \left\lfloor \frac{n^{(1,p)}_{PUCCH} - c \cdot N^{(1)}_{cs}/\Delta^{PUCCH}_{shift}}{c \cdot N^{RB}_{sc}/\Delta^{PUCCH}_{shift}} \right\rfloor + N^{(2)}_{RB} + \left\lceil \frac{N^{(1)}_{cs}}{8} \right\rceil & \text{otherwise} \end{cases} \quad \text{Equation 3}$$

$$c = \begin{cases} 3 & \text{normal cyclic prefix} \\ 2 & \text{extended cyclic prefix} \end{cases}$$

In Equation 3, $n^{(1,p)}_{PUCCH}$ is a PUCCH resource index of an antenna port p for PUCCH format 1/1a/1b. For ACK/NACK PUCCH, it is implicitly determined by the first CCE index of the PDCCH carrying scheduling information on the corresponding PDSCH.

$$m = \lfloor n^{(2,\tilde{p})}_{PUCCH}/N^{RB}_{sc} \rfloor \quad \text{Equation 4}$$

$n^{(2)}_{PUCCH}$ is a PUCCH resource index of an antenna port p for PUCCH format 2/2a/2b, and the value thereof is transmitted from the eNB to the UE by higher layer signaling.

$$m = \lfloor n^{(3,\tilde{p})}_{PUCCH}/N^{PUCCH}_{SF,0} \rfloor \quad \text{Equation 5}$$

$n^{(3)}_{PUCCH}$ is a PUCCH resource index of an antenna port p for PUCCH format 2/2a/2b, and the value thereof is transmitted from the eNB to the UE by higher layer signaling. $N^{PUCCH}_{SF,0}$ denotes the spreading factor (SF) for the first slot of a subframe. $N^{PUCCH}_{SF,0}$ is 5 for both 2 slots in a subframe using general PUCCH format 3. $N^{PUCCH}_{SF,0}$ is 5 and 4 for the first and second slots in a subframe using reduced PUCCH format 3.

Referring to Equation 3, a PUCCH resource for ACK/NACK is not pre-allocated to each UE, and but a plurality of PUCCH resources is allocated to a plurality of UEs in a cell at every point of time. Specifically, a PUCCH resource used by the UE to transmit the ACK/NACK is dynamically determined based on the PDCCH carrying the scheduling information on the PDSCH carrying the corresponding downlink data or the PDCCH indicating SPS release. A region in which the PDCCH is transmitted in each DL subframe includes a plurality of control channel elements (CCEs), and the PDCCH transmitted to the UE consists of one or more CCEs. The UE transmits ACK/NACK through a PUCCH resource linked to a specific CCE (for example, the lowest index CCE) among the CCEs constituting the PDCCH that the UE has received.

Each PUCCH resource index corresponds to a PUCCH resource for ACK/NACK. For example, when it is assumed that the scheduling information on the PDSCH is transmitted to the UE through a PDCCH consisting of the CCEs #4 to #6 and the CCE #4 is linked to the PUCCH resource index 4, the UE transmits an ACK/NACK for the PDSCH to the eNB through PUCCH resource #4 corresponding to CCE #4. Specifically, the PUCCH resource index for transmission by two antenna ports ($p_0$ and $p_1$) in the 3GPP LTE(-A) system is determined as follows.

$$n^{(1,\tilde{p}=\tilde{p}0)}_{PUCCH} = n_{CCE} + N^{(1)}_{PUCCH} \quad \text{Equation 6}$$

$$n^{(1,\tilde{p}=\tilde{p}1)}_{PUCCH} = n_{CCE} + N^{(1)}_{PUCCH} \quad \text{Equation 7}$$

Here, $n^{(1,\tilde{p}=\tilde{p}0)}_{PUCCH}$ denotes a PUCCH resource index (i.e. number) to be used by antenna port $p_0$, $n^{(1,\tilde{p}=\tilde{p}1)}_{PUCCH}$ denotes a PUCCH resource index to be used by antenna port $p_1$, and $N^{(1)}_{PUCCH}$ denotes a signaling value received from higher layer. CCE is the lowest of CCE indexes used for PDCCH transmission. For example, when the CCE aggregation level is higher than or equal to 2, the first CCE index among indexes of a plurality of aggregated CCEs for PDCCH transmission is used in determining an ACK/NACK PUCCH resource. The cyclic shift (CS), orthogonal code (OC) and PRB for the PUCCH format are obtained from $N^{(1)}_{PUCCH}$.

When PUCCH format 3 is configured for ACK/NACK transmission, a specific one of the PUCCH format 3 resource indexes ($n^{(3)}_{PUCCH}$) allocated by an higher layer (e.g., RRC) may be indicated by an ACK/NACK resource indicator (ARI) value of the DL grant PDCCH (explicit PUCCH resource). The ARI is transmitted through the TPC field of the PDCCH that schedules PDSCH of the Scell. The OC and PRB for PUCCH format 3 are obtained from $n^{(3)}_{PUCCH}$.

In the case of EPDCCH-based scheduling, the ACK/NACK transmission resource for the DL data scheduled by the DL grant EPDCCH may be determined as a PUCCH resource linked to a specific ECCE index (e.g., minimum ECCE index) constituting the DL grant EPDCCH and an ECCE index obtained by adding a specific offset value to the specific ECCE index. In addition, the ACK/NACK feedback transmission resource may be determined as a PUCCH resource linked to a specific ECCE index (e.g., a minimum ECCE index) constituting the DL grant EPDCCH or a PUCCH resource obtained by adding a specific offset value to the specific ECCE index. Here, the specific offset value may be determined by a value directly signaled through the ARO (ACK/NACK Resource Offset) field in the DL grant EPDCCH and/or a value designated dedicatedly for each antenna port. Specifically, the information signaled through the TPC field and the ARO field in the DL grant EPDCCH according to the frame structure type (e.g., FDD or TDD) and the ACK/NACK feedback transmission scheme (e.g., PUCCH format 3 or channel selection) may be configured as follows. For simplicity, the TPC command for PUCCH power control is defined as "TPC value", an offset value added in determining an implicit PUCCH index is defined as "ARO value", and the ARI indicating a specific one of a plurality of PUCCH format 3 indexes or a plurality of PUCCH format 1 indexes (a plurality of PUCCH format 1 index groups) allocated through RRC is defined "ARI value". A fixed value (e.g., '0') that is inserted without any information (for use such as virtual CRC) is defined as a "fixed value".

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal sub-carriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE monitors a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1,2,4,8,16,32\}$ is defined by a set of EPDCCH candidates. For an EPDCCH-PRB-set p configured for distributed transmission, the ECCEs corresponding to EPDCCH candidate m of the search space $ES^{(L)}_k$ are given by the following table.

$$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k}/L \rfloor \right\} + i \qquad \text{Equation 8}$$

where $i=0, \ldots, L-1$. $b=n_{CI}$ if the UE is configured with a carrier indicator field for the serving cell on which EPDCCH is monitored, otherwise $b=0$. $n_{CI}$ is the carrier indicator field (CIF) value, which is the same as a serving cell index (ServCellIndex). $m=0, 1, \ldots, M_p^{(L)}-1$, $M_p^{(L)}$ is the number of EPDCCH candidates to monitor at aggregation level L in EPDCCH-PRB-set p. The variable $Y_{p,k}$ is defined by '$Y_{p,k}=(A_p \cdot Y_{p,k-1}) \mod D$', where $Y_{p,k-1}=n_{RNTI} \neq 0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 7, the number of EREGs per ECCE is given by Table 8. Table 7 shows an example of supported EPDCCH formats, and Table 8 shows an example of the number of EREGs per ECCE, $N^{EREG}_{ECCE}$. Both localized and distributed transmission is supported.

TABLE 7

Number of ECCEs for one EPDCCH, $N^{ECCE}_{EPDCCH}$

| EPDCCH format | Case A | | Case B | |
| --- | --- | --- | --- | --- |
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 8

| Normal cyclic prefix | | Extended cyclic prefix | |
| --- | --- | --- | --- |
| Normal subframe | Special subframe, configuration 3, 4, 8 | Special subframe, configuration 1, 2, 6, 7,9 | Normal subframe | Special subframe, configuration 1, 2, 3, 5,6 |
| 4 | | 8 | |

An EPDCCH may use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered $(n \mod N^{ECCE}_{RB})+jN^{ECCE}_{RB}$ in PRB index floor$(n/N^{ECCE}_{RB})$ for localized mapping, and EREGs numbered floor $(n/N^{Sm}_{RB})+jN^{ECCE}_{RB}$ in PRB indices $(n+j\max(1,N^{Sp}_{RB}/N^{EREG}_{ECCE})) \mod N^{Sp}_{RB}$ for distributed mapping, where $j=0, 1, \ldots, N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 7 applies when:
DCI formats 2, 2A, 2B, 2C or 2D is used and $N^{DL}_{RB} \geq 25$, or
any DCI format when $n_{EPDCCH} < 104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with $n'=n_{ECCE,low}$ mod $N^{ECCE}_{RB}$ $n_{RNTI}$ mod min($N^{ECCE}_{EPDCCH}$, $N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 9

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where p∈{107,109} for normal cyclic prefix and p∈{107,108} for extended cyclic prefix.

Hereinbelow, the PDCCH and the EPDCCH are collectively referred to as the PDCCH or the (E)PDCCH.

Embodiments of the present disclosure are also applicable to a new radio access technology (RAT) system in addition to the 3GPP LTE/LTE-A system. As more and more communication devices require a larger communication capacity, the need for enhanced mobile broadband communication, compared to the legacy RAT, is pressing. Further, massive MTC that interconnects a plurality of devices and things and thus provides them with various services irrespective of time and place is also one of important issues to be considered for future-generation communication. In addition, a communication system design in which services/UEs sensitive to reliability and latency are considered is under discussion. The introduction of a future-generation RAT in consideration of the enhanced mobile broadband communication, massive MTC, and ultra-reliable and low-latency communication (URLLC) is under discussion. For the convenience, the corresponding technology is referred to as a new RAT in the present disclosure.

In the next LTE-A system, a technique for reducing the latency of data transmission is considered. Packet data latency is one of performance metrics that vendors, operators, and end-users measure regularly (by a speed test application). Among all phases of the lifetime of a wireless access network system, a latency is measured in a new software release or system component verification phase, a system deployment phase, and a system commercialization phase.

Better latency than in previous generations of 3GPP RATs was one performance metric that led to the design of LTE. LTE is now perceived to end-users as a system that provides faster access to the Internet and lower data latencies than previous generations of mobile radio technologies.

However, almost no improvements targeting particularly at delays in a system have been made. Packet data latency is a parameter that indirectly affects the throughput of the system as well as the perceived responsiveness of the system. Hypertext transfer protocol/transmission control protocol (HTTP/TCP) is a dominant application and transport layer protocol suite used on the Internet today. According to HTTP Archive (http://httparchive.org/trends.php), HTTP-based transactions over the Internet are in a range of a few 10's of Kbytes to 1 Mbyte. In this size range, a TCP slow start period is a significant part of the total transport period of a packet stream. During the TCP slow start, the performance is limited by a latency. Hence, an improved latency may be readily presented to improve the average throughput for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in a UE and an eNB is to reduce a latency.

Radio resource efficiency may also be positively affected by latency reduction. A lower packet data latency may increase the number of transmission attempts possible within a certain delay bound. Hence, higher block error rate (BLER) targets may be used for data transmissions, freeing up radio resources but still keeping the same level of robustness for UEs in poor radio conditions. If the same BLER target is maintained, the increased number of possible transmissions within a certain delay bound may be interpreted as more robust transmissions of real-time data streams (e.g. voice over LTE (VoLTE)). This may improve the VoLTE voice system capacity.

There are a number of existing applications that may be positively affected by a reduced latency in terms of perceived quality of experience, such as gaming, real-time applications like VoLTE/over-the-top voice over Internet protocol (OTT VoIP), and video telephony/conferencing.

In the future, more and more new applications will be delay-critical. For example, delay may be a critical element to remote control/driving of vehicles, augmented reality applications in smart glasses, or specific machine communications requiring low latency as well as critical communications.

In embodiments of the present disclosure, which will be described below, "assumes" may mean that an entity transmitting a channel transmits the channel in accordance with the corresponding "assumption" or that an entity receiving the channel receives or decodes the channel in the form conforming to the "assumption" on the premise that the channel has been transmitted according to the "assumption".

Figure 5:
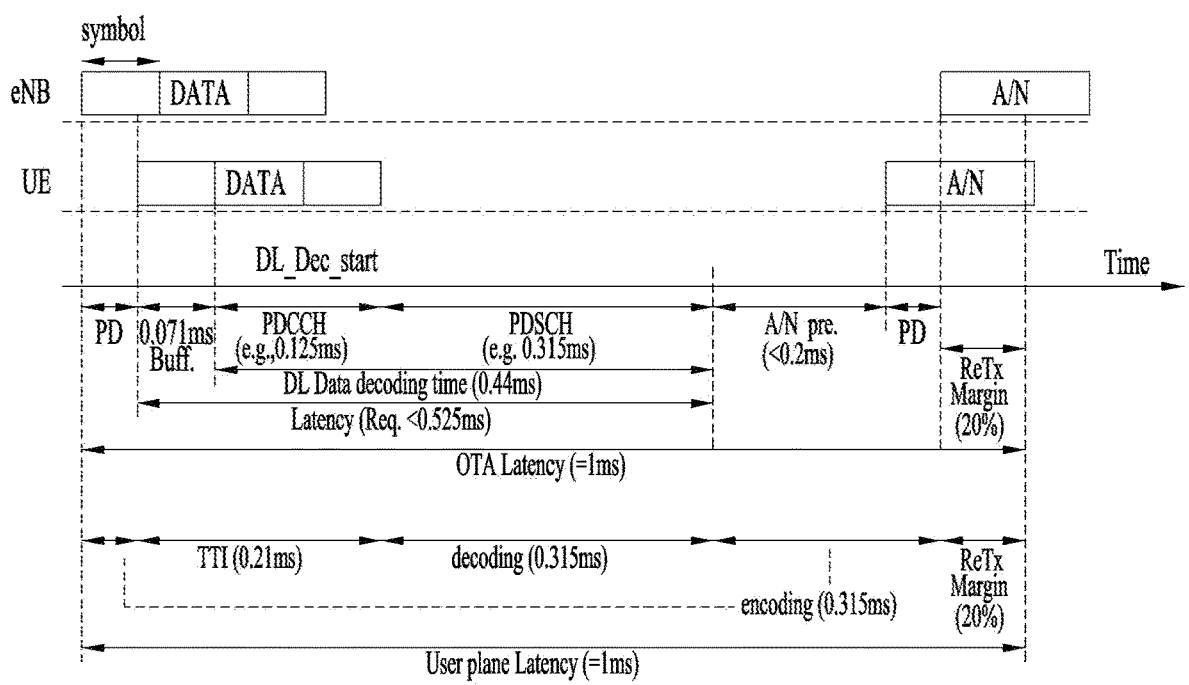
FIG. 5 illustrates an exemplary transmission time interval (TTI) length required to achieve a low latency.

FIG. 5 is an exemplary view illustrating a TTI length required to achieve a low latency.

In accordance with the present invention, TTI means an interval where data may be scheduled. For example, referring to FIGS. 1 and 3, transmission occasion of UL grant or DL grant in the current LTE/LTE-A system exists per 1 ms, and UL/DL grant does not exist several times within a time shorter than 1 ms. Therefore, in the current LTE/LTE-A system, TTI is 1 ms.

Referring to FIG. 5, while a signal transmitted by an eNB reaches a UE, the UE transmits an A/N for the signal, and the A/N reaches the eNB, an over the air (OTA) latency occurs, which involves a DL propagation delay (PD), a buffering time, a decoding time, an A/N preparation time, a UL PD, and a retransmission margin. To satisfy a low latency, there is a need for newly designing a shortened TTI (i.e., sTTI) spanning 0.5 ms or shorter by shortening a minimum unit of data transmission, TTI. For example, if the OTA latency, which is a time period from the start of transmission of data (a PDCCH and a PDSCH) in the eNB to completion of transmission of an A/N for the data from the UE to the eNB, is to be reduced to or below 1 ms, the TTI is preferably set to 0.21 ms. That is, to reduce a user-plane (U-plane) latency to 1 ms, an sTTI may be configured in units of about three OFDM symbols.

While an sTTI is configured to include three OFDM symbols to decrease an OTA latency or a U-plane latency to 1 ms in FIG. 5, by way of example, an sTTI of a length shorter than 1 ms may also be configured. In the normal CP case, for example, there may be an sTTI with two OFDM symbols, an sTTI with four OFDM symbols, and/or an sTTI with seven OFDM symbols.

The total OFDM symbols of a TTI or the remaining OFDM symbols of the TTI except for OFDM symbols occupied by a PDCCH region in the TTI may be divided into two or more sTTIs in the time domain in the whole or a part of frequency resources of the TTI.

Hereinbelow, a default or main TTI used in the system will be referred to as a normal TTI or a normal subframe, and a TTI shorter than the default/main TTI of the system will be referred to as an sTTI. For example, a TTI having a time length shorter than 1 ms may be referred to as an sTTI in a system using the 1-ms TTI as a default TTI, like the LTE/LTE-A systems up to now. Also, TTI longer than normal TTI is referred to as long TTI. For example, like the current LTE/LTE-A system, in a system in which TTI of 1 ms is used as default TTI, TTI having a time length longer than 1 ms may be referred to as long TTL In the present invention, normal TTI may mean default TTI used per carrier.

Hereinbelow, a PDCCH/PDSCH/PUSCH/PUCCH transmitted in units of a default/main TTI is referred to as a PDCCH/PDSCH/PUSCH/PUCCH, and a PDCCH/PDSCH/PUSCH/PUCCH transmitted in an sTTI or in units of an sTTI is referred to as a shortened PDCCH/shortened PDSCH/shortened PUSCH/shortened PUCCH (sPDCCH/sPDSCH/sPUSCH/sPUCCH). Although a different default/main TTI from that of the current LTE/LTE-A system may be used in a new RAT environment due to the change of numerology, embodiments of the present disclosure will be described below on the assumption that the time length of the default/main TTI is 1 ms, the default/main TTI is referred to as a legacy TTI or subframe, and a TTI shorter than the 1-ms TTI is referred to as an sTTI. Methods for transmitting/receiving a signal in a TTI and an sTTI according to the following embodiments may be applied in the same manner to a default/main TTI and an sTTI in a system based on numerology for a new RAT environment as well as a system based on the current LTE/LTE-A numerology.

The present invention relates to a method that provides services by applying different system parameters to each service or each UE to satisfy requirements of each service while providing a plurality of different services in one system. According to the present invention, short TTI is used for a service/UE susceptible to latency, whereby data may be transmitted/received for a short time as soon as possible and a response to data transmission and reception may be transmitted/received for a short time. As a result, latency may be reduced as much as possible. Also, according to the present invention, longer TTI is used for a service/UE less susceptible to latency, whereby data may be transmitted/received. According to the present invention, for a service/UE susceptible to power efficiency instead of delay, data may be transmitted repeatedly at the same low power or TTI may be increased. To enable this operation, the present invention suggests a method for transmitting and multiplexing control information and data signal. The present invention is associated with a transmission aspect of a network and a reception aspect of a UE, multiplexing of several TTIs in one UE, and multiplexing of several TTIs between several UEs.

Hereinafter, for convenience of description, the embodiments of the present invention will be described on the assumption that basic TTI is 1 ms used in the current LTE/LTE-A system and a basic system is based on LTE/LTE-A system. That is, TTI of 1 ms will be referred to as normal TTI, and TTI of a unit smaller than 1 ms, for example, TTI of 0.5 ms will be referred to as short TTI, and TTI longer than 1 ms, for example, TTI of 2 ms will be referred to as long TTI.

The eNB according to the present invention transmits/receives a data/control channel having TTI of a unit shorter than 1 ms for a service/UE susceptible to latency while providing a service to different services/UEs on the basis of TTI of 1 ms, that is, a subframe length.

According to the present invention, in a system based on normal TTI of 1 ms unit used in the legacy LTE/LTE-A system, short TTI smaller than 1 ms may be supported.

Figure 6:
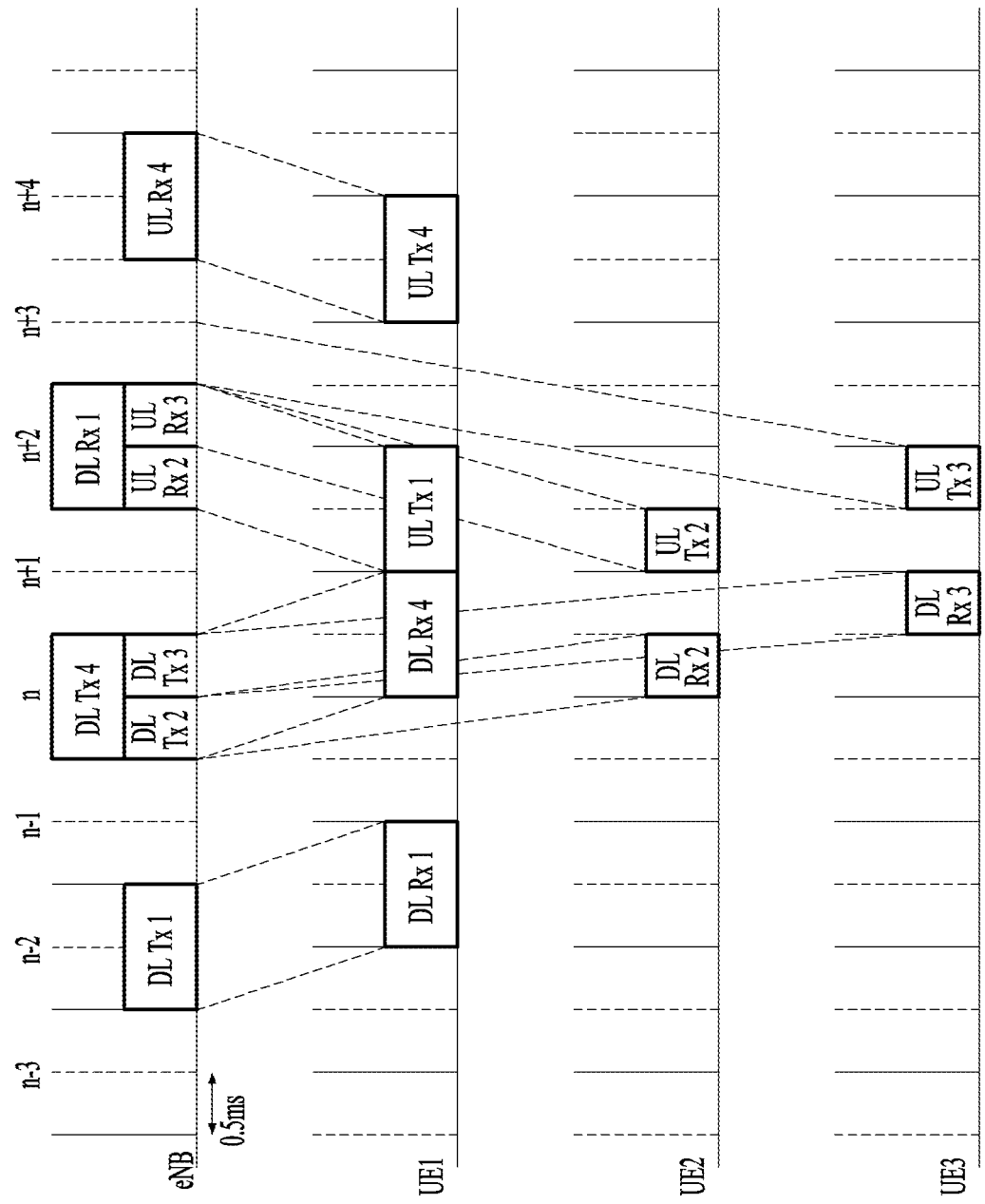
FIG. 6 illustrates a relation between downlink transmission timing and uplink transmission timing according to the present invention.

FIG. 6 illustrates a relation between downlink transmission timing and uplink transmission timing according to the present invention. In FIG. 6, DL Tx i, UL Rx UL Tx i, and UL Rx i respectively mean transmission of DL channel i by eNB, reception of DL channel i by UE, transmission of UL channel i corresponding to the DL channel i by the UE, and reception of the UL channel i by the eNB.

The eNB may multiplex downlink channels having TTI of different sizes, and may receive uplink channels for the multiplexed downlink channels. If TTI becomes shorter, the buffering time of the UE, which has received a downlink channel of short TTI, and the decoding time of the control channel and the data channel become shorter, and the time required to transmit the uplink channel for the downlink channel becomes shorter.

For example, referring to FIG. 6, the eNB may receive an uplink response (UL Rx 4) of 1 ms TTS for a downlink channel (DL Tx 4) of 1 ms TTI, which is transmitted at a subframe n, at a subframe n+4. On the other hand, the eNB receives an uplink response (UL Rx 2 or UL Rx 3) of 0.5 ms TTS for a downlink channel (DL Tx 2 or DL Tx 3) of 0.5 ms TTI, which is transmitted at a subframe n, at a subframe n+2. For downlink and uplink multiplexing of channels having TTIs of different lengths, hereinafter, the present invention will be described based on that backward compatibility should be supported so as not to affect a UE operated only in the legacy system. However, the present invention described hereinafter may be applied to even the case that several TTIs coexist in a new system having no backward compatibility or radio access technology (RAT).

When TTI downlink channels of different lengths are multiplexed, a detailed method as to how a UE, which has received the multiplexed downlink channels, will read a control and receive a data channel is required. A UE for supporting normal TTI only, a UE for supporting normal TTI and short TTI, and a UE for supporting normal TTI, short TTI and long TTI may exist in one system. In this case, if the UE supports short TTI and normal TTI, it means that the UE may receive and demodulate/decode a channel transmitted through short TTI and a channel transmitted through normal TTI, and may generate a short TTI channel and a long TTI channel and transmit the generated channels in uplink.

The present invention suggests that a UE and a eNB may transmit and receive signals by using a plurality of TTIs when a plurality of TTIs having a plurality of lengths exists in one system unlike a system such as the legacy LTE/LTE-A system, in which TTI length is fixed to 1 ms and all UEs and eNBs transmit and receive signals of 1 ms unit. Particularly, the present invention suggests a method for enabling an eNB and a UE to perform communication with each other while supporting a variable TTI length when the TTI length is variable, and a multiplexing method per channel and UE. The present invention is described based on the legacy LTE/LTE-A system but may be applied to the other systems in addition to LTE/LTE-A or RAT.

<A. Support of Different TTIs within Normal TTI>

When there is a UE that support additionally TTI of a length different from that of normal TTI in a system for supporting normal TTI, default capability of the UE in the corresponding system is normal TTI. More generally, default TTI may exist for one band/carrier, and the UE may be forced to support the default TTI. That is, if the UE supports the corresponding carrier/frequency/band, the UE may have to support default TTI used at the corresponding frequency. A default TTI size of the corresponding system may be determined by TTI/numerology for which system information such as PBCH is transmitted. The default TTI may be 1 ms, or may be a value smaller than or greater than 1 ms depending on carrier frequency. According to the present invention, the UE, which may support all of TTIs of different lengths in addition to normal or default TTI, reports its TTI capability to the eNB. If there are a plurality of TTI lengths, the UE may report its capability per TTI length. If decoding capability of the UE is linearly decreased in accordance with decrease of the TTI length, the UE may assume that a maximum transport block size (TBS) is decreased linearly depending on a TTI length or in accordance with a certain function. Alternatively, this TBS and TTI size may be values previously designated. The UE reports information as to whether TTI of another length in addition to normal TTI may be supported and information as to how many lengths of TTI may be supported. That is, the UE reports TTI length and type that may be supported by the UE. For example, the UE may report its buffering capability or the number of buffers, decoding capability, and multiplexing/demultiplexing capability. In this case, the decoding capability may mean the time required for the UE to decode corresponding data when the corresponding data of a specific transport block size is transmitted at a specific TTI length. The decoding capability may additionally include the time required to transmit a signal such as a response signal (e.g., ACK/NACK) after decoding. The UE may separately signal the decoding capability for a control channel, a data channel and/or a downlink/uplink. Otherwise, required decoding delay/capability may previously be configured per TTI length. Otherwise, the UE may signal a class of the shortest TTI supported by the UE or buffering capability/the number of buffers, decoding capability, etc. In this case, the eNB may assume that a TTI length greater than the TTI length reported by the UE may be supported by the UE.

The UE capability reported by the UE may mean capability when the UE supports short TTI. Capability as to whether default TTI and short TTI may be supported at the same time may be configured separately, or may be UE requirement assumed when short TTI is supported.

The UE may receive sPDSCH transmitted with normal TTI and sPDSCH transmitted with short TTI, at the same time. In this case, the UE should receive/store PDSCH transmitted with normal TTI and sPDSCH transmitted with short TTI within at least two or more buffers, respectively, and demodulate/decode the received/stored data. Whether the UE may receive the PDSCH and the sPDSCH at the same time may be related to how many codewords the UE can receive. Similarly, whether the UE may receive the PDSCH and the sPDSCH at the same time may be related to carrier aggregation (CA) capability of the UE. A UE support capability of different TTI lengths is a type of data processing capability of the UE, and may be processed within entire data processing capability of the UE together with MIMO capability of the UE and CA capability of the UE to avoid increase of unnecessary complexity of the UE and to avoid excessively increasing UE capability. The UE may report whether to support default/short TTI simultaneously at one carrier as UE capability. To support a different TTI length for the UE, the network may limit a TBS transmitted at TTI of another length in addition to normal TTI. The network may select a limitation, which may be configured for the UE, by means of combination of MIMO capability, CA capability, and short TTI support capability, which are reported by the UE. The current UE capability is defined by maximum transport block (TB) per TTI, maximum data per TTI, and soft buffer, and is divided into a case that 256 quadrature amplitude modulation (QAM) is supported and a case that 256 QAM is not supported. If it is assumed that one short TTI in addition to default TTI is introduced, maximum TB per TTI when short TTI is used and maximum data per TTI may be defined. When data above a category defined by the UE are transmitted, the UE may drop the data. A priority as to which data will be dropped by the UE may be designated such that ambiguity may not occur in HARQ-ACK timing with the network. For example, a priority may be given to long TTI or default TTI, a priority may be designated in accordance with network configuration, or a priority may be given to short TTI.

The UE performs only the operation according to normal TTI until another TTI in addition to normal TTI is configured for the UE after the UE reports its TTI capability to the eNB. That is, the UE monitors only a control channel transmitted with normal TTI, and a data channel according to the corresponding control channel is transmitted/received with normal TTI. The configuration of another TTI may be transmitted through a specific channel transmitted with normal TTI. At this time, another TTI configuration for DL reception and another TTI configuration for UL transmission may separately be provided to the UE. That is, in view of one UE, DL transmission may be configured with normal TTI, and UL transmission may be configured with short TTL By contrast, the eNB may signal such that DL transmission may be configured with short TTI and UL transmission may be configured with normal TTI, or DL/UL transmission may be configured with short TTI. TTI different from normal TTI length is not always short TTI, and a plurality of short TTIs or long TTIs may coexist in the system. However, for convenience of description, the present invention will be described based on short TTI. If TTI is configured, then information such as reconfiguration on another TTI may be transmitted in the TTI, i.e., TTI length for transmitting/receiving data at the corresponding time. For example, the UE which supports short TTI may be operated in normal TTI as default, and may transmit/receive data in short TTI if short TTI configuration is received from the eNB. At this time, the eNB may separately transmit DL short TTI configuration or UL short TTI configuration. Alternatively, the eNB may transmit UL/DL short TTI configuration together. If the short TTI is separately configured for UL and DL, DL TTI size may be different from UL TTI size at a specific time in view of the UE.

Short TTI may be enabled by UE-specific higher layer signaling. Alternatively, RACH configuration for short TTI may be transmitted through system information block (SIB), etc. If RACH configuration for short TTI is provided through SIB, the UE for supporting the short TTI may read the SIB and use the short TTI starting from transmission according to the RACH configuration. The short TTI may be triggered when the UE can support the short TTI. If the short TTI is configured, it may mean that more power is required to transmit PUCCH for a relatively short time, whereby the UE may be configured to it if measurement such as reference signal received power (RSRP) and reference signal received quality (RSRQ) is equal to or larger than a certain threshold value. For example, the threshold value may be included in RACH resource configuration, and if RSRP (or RSRQ) equal to or larger than the threshold value is measured, the UE may perform RACH transmission by using short TTI. The UE may assume PRACH format 4, which may be transmitted in UpPTS, as a format of RACH used in short TTI. Information as to whether the UE should transmit RACH with short TTI or default TTI may dynamically be notified to the UE. TTI used by UL/DL control channel or UL/DL RS may be configured in advance, or may correspond to a value configured together with RACH resource configuration.

Information included in (short/long) TTI configuration may be as follows.

Configured TTI size different from normal TTI: Configured TTI size (e.g., 0.1 ms, 0.5 ms or 2 ms) or the number (e.g., 2 if the configured TTI is 0.5 ms and 0.5 if the configured TTI is 2 ms) of TTIs configured per normal TTI.

Control channel monitoring set: set of TTIs for which the UE should monitor a control channel for short TTI.

Control channel configurations: control channel information for short/long TTI, RS information, control channel PRB set, the number of OFDM symbols used for control channel, the number of control channel resource sets, transmission scheme (e.g., distributed or localized), the number of control channel candidates.

TTI configuration information may individually be provided to the UE. Alternatively, the TTI configuration information may be provided per TTI length through SIB. The UE may apply the configuration provided through SIB per TTI length.

In the LTE/LTE-A system, the UE basically monitors legacy PDCCH/EPDCCH transmitted in a unit of normal TTI (e.g., 1 ms). A method for supporting default TTI and short TTI may be restricted to TDM in accordance with UE capability or supported simultaneously, or a priority may be given to one of transmission of default TTI and transmission of short TTI if transmission of default TTI and transmission of short TTI collide with each other. The UE may signal the supporting scheme with its capability. If the UE is configured to monitor both default TTI and short TTI, the UE which has received the short TTI configuration may assume that the control channel is transmitted per short TTI. For example, the UE may assume that the control channel is transmitted per TTI of the smallest unit supported by the UE. That is, this may mean that the control channel should be monitored per short TTI.

To avoid unnecessary power consumption of the UE, the eNB may configure short TTIs which should be monitored by the UE, that is, short TTI monitoring set for the UE for supporting short TTI. For example, the eNB may notify the UE of short TTI for which sPDCCH may be transmitted. The short TTI monitoring set may be designated for the UE in the form of a bitmap, for example. If the default TTI has a size of 1 ms and includes two slots of 0.5 ms, the short TTI has a size of 0.5 ms and the UE may monitor sPDCCH at the second slot only, the short TTI monitoring set may be provided for one frame comprised of 10 default TTIs in the form of {10101010101010101010}. In the present invention, it is assumed that long TTI length and single short TTI are used. However, one or more short TTI lengths may be used. If the UE supports a plurality of short TTI lengths, there is no problem when the UE may perform an independent process per TTI length. However, in other case, the same/similar rule applied when the default TTI length and one short TTI length are supported may be applied to support the plurality of short TTI lengths.

Referring to FIG. 3, in the legacy LTE/LTE-A system, one subframe, that is, TTI is 1 ms, and includes two slots. The legacy downlink control channel (e.g., PDCCH) is located in the front of a subframe, and frequency resources constituting the PDCCH are distributed over a corresponding system band. After the PDCCH, a downlink data channel (e.g., PDSCH) is transmitted, and PDSCHs of UEs are multiplexed on a frequency axis after a PDCCH duration. The UE should know a position to which the corresponding PDSCH is transmitted, to receive its PDSCH. The UE acquires information as to a position to which the corresponding PDSCH is transmitted, MCS, RS information, antenna information, transmission scheme, information on transmission mode (TM) through a PDCCH transmitted before a PDSCH time duration.

The UE for which short TTI monitoring set is configured searches for its EPDCCH at only short TTI which is indicated. On the other hand, the legacy PDCCH/EPDCCH may be monitored for normal TTI in accordance with the legacy monitoring rule. Basically, the legacy PDCCH may be monitored per normal TTI. Rules of EPDCCH monitoring are as follows.

In case of normal TTI for which EPDCCH is configured, the UE monitors only EPDCCH at its UE-specific search space (USS).

In case of normal TTI for which EPDCCH is configured, the UE monitors only PDCCH at a common search space (CSS).

In case of normal TTI for which EPDCCH is not configured, the UE monitors PDCCH at both CSS and USS.

If the short TTI monitoring set is configured, the UE may be operated as follows.

If PDCCH is transmitted within a specific short TTI to be monitored, the UE searches its sPDCCH within a PDCCH region. For example, the UE may perform blind decoding within sPDCCH search space within the legacy PDCCH region. In this case, the number of PDCCH candidates may be restricted by short TTI. For example, for short TTI, a subset of the legacy PDCCH search space may be applied to the UE. If EPDCCH is configured, the sPDCCH search space may be configured even within an EPDCCH region. In this case, the UE may monitor the sPDCCH search space configured within the EPDCCH region configured at default TTI equally or similarly to monitoring of the sPDCCH search space configured within the legacy PDCCH region.

If a specific short TTI to be monitored by the UE is included in the EPDCCH monitoring set, the UE searches for its sPDCCH at the sPDCCH search space within the EPDCCH region within the corresponding short TTI.

It may be assumed that the common search space (CSS) of sPDCCH always exists only in the PDCCH region.

Short TTI configuration information of the UE may be provided to the UE by RRC signaling after capability reporting of the UE, and its update may be performed semi-statically. If the short TTI configuration information is provided or updated semi-statically, it means that the short TTI is used semi-statically. If the short TTI is used semi-statically, gain to be achieved by use of the short TTI may be restrictive. If traffic having a big data size is increased, it is efficient that long TTI rather than short TTI is used to transmit the data once. If short TTI is used semi-statically, it is difficult to dynamically change TTI length in accordance with traffic load. Therefore, among the short TTI configuration information, the short TTI monitoring set may dynamically be notified to the UE by DCI. In other words, the UE monitors both short TTI and default TTI to receive a control channel, and TTI used for the UE to receive PDSCH may be notified to the UE through DCI.

<B. PHICH According to PUSCH/sPUSCH Transmission>

If short TTI and normal TTI coexist, it is preferable that system information such as master information block (MIB) and/or system information block (SIB) is transmitted with normal TTI. The system information should reach a UE well. This is because that the UE cannot transmit/receive a signal properly if the system information is transmitted with short TTI and does not reach a cell edge. In a similar sense, the CSS may be limited to exist for only the legacy PDCCH. However, as discussed in section A, since RACH may reduce latency by using short TTI, the CSS may be configured to be applied to short TTI. If short TTI is applied to RACH, in order to reduce overhead or avoid the introduction of a new CSS, the UE may be restricted to enable short TTI for RACH only after the UE establishes with a network and then short TTI is configured. This CSS for reception of a random access response for RACH preamble transmitted with short TTI may be cell-specific. Alternatively, if short TTI is applied to RACH, a random access response (RAR) may be transmitted through a UE-specific search space (USS).

A short TTI monitoring set of the UE is related with A/N signaling for PUSCH (i.e., sPUSCH) of short TTI. If a specific short TTI in which A/N for sPUSCH is transmitted is not included in the short TTI monitoring set of the UE, the UE fails to receive A/N for its uplink transmission. For this reason, if radio link control (RLC) NACK occurs, latency may be increased. Therefore, a method for solving latency should be provided. A/N signaling for PUSCH transmission is referred to as PHICH in the LTE/LTE-A system, and PHICH is transmitted in a PDCCH region. If short TTI is configured, it may be difficult that PHICH for sPUSCH is transmitted. This is because that PDCCH is located at the front OFDM symbol(s) where normal TTI starts as shown in FIG. 3. The following methods for A/N transmission for sPUSCH may be considered.

Scheme 1. A/N for PUSCH is always operated in a PHICH scheme, and A/N for sPUSCH is operated in a UL grant scheme.

Scheme 2. A/N for sPUSCH transmitted in short TTI located at the front within normal TTI is operated in a PHICH scheme, and A/N for sPUSCH transmitted in other short TTI(s) in addition to the short TTI at the front is operated in a UL grant scheme.

Scheme 3. Delay is given per short TTI for a certain time, and A/N for sPUSCH may be transmitted through PHICH in a PDCCH region after a certain time delay.

Scheme 4. EPHICH may be introduced. In this case, EPHICH may carry A/N for several UEs in the form of DCI.

The scheme 4 may be combined with the above schemes, and EPHICH may be used in the schemes 1 and 2 instead of UL grant.

The UL grant scheme means that the eNB commands adaptive retransmission for corresponding data by transmitting UL grant only if retransmission is required without transmitting separate A/N for the sPUSCH after receiving the sPUSCH. The UE according to the UL grant scheme does not wait for separate A/N transmission from the eNB after transmitting sPUSCH and does not perform retransmission arbitrarily even in case the there is no A/N.

In the scheme 2, if PHICH resource is determined by the lowest PRB index of PUSCH resource like the legacy case, PHICH for PUSCH transmitted with normal TTI and PHICH transmitted with short TTI may collide with each other at the same time resource. In the system which uses a single TTI length, timing of PUSCH transmission and timing of DL PHICH transmission are aligned well and thus there is no need to be afraid of collision between PHICHs. On the other hand, in the system of a plurality of TTI lengths, since UL/DL timing is varied per different TTI lengths as shown in FIG. 6, a risk of collision between the PHICHs may be increased. To solve this problem, in case of the scheme 2, different DM-RS cyclic shifts (CS) may be applied to PHICH for PUSCH and PHICH for sPUSCH. For example, certain DM-RS CS offset is always applied to DM-RS CS applied to PHICH for PUSCH, whereby DM-RS CS is obtained. The DM-RS CS is applied for PHICH transmission for sPUSCH, whereby collision between PHICH for PUSCH and PHICH for sPUSCH may be avoided. The DM-RS CS offset may be a function of index of short TTI within normal TTI. Alternatively, the network may transmit the DM-RS CS offset by including the DM-RS CS offset in DCI.

In the scheme 3, certain time delay (e.g., maximum one normal TTI) is given to A/N for sPUSCH, and A/N for the sPUSCH is transmitted through PHICH within a PDCCH region of next normal TTI. PHICH resources for sPUCCHs according to the scheme 3 may be allocated by applying different DM-RS CS offsets to DM-RS CS for resource allocation of PHICH for PUCCH in accordance with short TTI indexes of sPUSCHs.

sPDCCH may provide control information for DL/UL short TTI transmission. sPDCCH is transmitted with short TTI but may provide control information for DL/UL transmission for normal TTI. For example, if a length of short TTI is set to 0.5 ms, UL grant transmitted with short TTI may command the UE, which has received the UL grant, to transmit PUSCH of normal TTI. Similarly, if UL grant is transmitted through one sPDCCH, whether the UL grant is the UL grant for sPUSCH transmission at the first slot or the UL grant for sPUSCH transmission at the second slot may be signaled through separate index signaling like UL subframe index signaling used in a TDD system, or whether the UL grant commands sPUSCH transmission through the first and second slots may be signaled.

TBS that can be transmitted through PDSCH/PUSCH may be proportional to TTI length. The number of bits that can be transmitted using the same amount of frequency resources (PRB) are different for 1 ms, 0.5 ms and one OFDM symbol duration. If a transmission time duration becomes long, TBS that may be transmitted becomes great, and if the transmission time duration becomes short, the TBS that may be transmitted becomes small. In the legacy LTE/LTE-A system, if the UE measures and reports CSI, the eNB schedules PDSCH/PUSCH to the UE on the basis of the CSI. At this time, the TBS is determined by MCS index for PDSCH/PUSCH and the number of allocated PRBs. The following Table illustrates modulation defined in the 3GPP TS 36.213 document and a mapping relation between TBS index and TBS. Particularly, Table 10 illustrates modulation for PDSCH and TBS index, and Table 11 illustrates some of TBS table according to MCS index $I_{MCS}$ and TBS index $I_{TBS}$.

TABLE 10

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 11

| | | | | | $N_{PRB}$ | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |

A modulation order $Q_m$ and TBS index $I_{TBS}$ are determined in accordance with MCS index $I_{MCS}$ scheduled by the eNB, and TBS is determined by TBS index $I_{TBS}$ and the number of PRBs $N_{PRB}$. Table 10 and Table 11 illustrate values obtained by assuming TTI of 1 ms.

If the UE of which data channel is scheduled in a unit of sTTI uses the legacy TBS/MCS Table (e.g., Table 10), the eNB has a problem in MCS and resource allocation on the basis of CSI reported by the UE.

In one embodiment of the present invention, when the eNB schedules sPDSCH/sPUSCH in a unit of sTTI on the basis of CSI reported by the UE, $N_{PRB}$ used by the UE is increased in inverse proportion to the length of sTTI. Therefore, if the length of sTTI is 0.5 ms, for example, $N_{PRB}$ of the UE may be twice of $N_{PRB}$ of the legacy table. In other words, if the length of sTTI corresponds to '1/n' times of a normal TTI length, the UE may assume that $N_{PRB,s}$ of PRB used for a data channel transmitted/received within sTTI corresponds to n times of the scheduled $N_{PRB}$. Therefore, the UE may determine TBS by applying $N_{PRB,s}$ to a value of $N_{PRB}$ of Table 11.

TBS used at sTTI may be determined by scaling the number of PRBs used in normal TTI. However, if the number of PRBs used at one sTTI is used as a frequency axis, since an available channel bandwidth is limited, $N_{PRB,s}$ may be increased infinitely, whereby some of values defined in the legacy TBS table may be restricted by the channel bandwidth. Therefore, if there is a problem in enlarging radio resources of a data channel of sTTI along a frequency axis, that is, scaling $N_{PRB}$, the data channel may be enlarged along a time axis. Enlargement of the data channel along the time axis may mean that the data channel of sTTI is scheduled over a plurality of sTTIs not a single sTTI. If resources for sTTI are enlarged along the time axis, the UE may assume that sPDSCH/sPUSCH is scheduled to itself in a specific frequency resource by a specific MCS for n sTTIs without separate another control channel signaling. In this case, HARQ processes may be allocated to each of sPDSCHs/sPUSCHs received/transmitted at n sTTIs, and A/Ns for each of the sPDSCHs/sPUSCHs may be reported/received.

<C. DL Channel Multiplexing>

In section C, a multiplexing scheme of the legacy PDCCH/PDSCH and sPDCCH/sPDSCH and UE/eNB operation according to the multiplexed result will be described. Hereinafter, the multiplexing scheme of PDCCH/PDSCH and sPDCCH/sPDSCH will be described based on an example that two short TTI channels exist within one subframe but the section C is not limited to short TTI of 0.5 ms.

sPDCCH for sPDSCH transmitted at the first slot exists in the legacy PDCCH region, and sPDCCH for sPDSCH transmitted at the second slot may be transmitted at the second slot. Particularly, sPDCCH transmitted at the first slot provides control information on sPDSCH transmitted at the first slot, and sPDCCH transmitted at the second slot provides control information on sPDSCH transmitted at the second slot.

If resource allocation information of sPDSCH is provided to the UE in the same manner as resource allocation information of the legacy PDSCH, time resources by occupied by sPDSCH and the legacy PDSCH on the time axis are different from each other, and thus information indicating that a region occupied by sPDSCH on the time axis is smaller than that of the legacy PDSCH should be indicated. For example, information indicating that a time duration spanned by sPDSCH scheduled by sPDCCH is limited within 0.5 ms may be added to the legacy DCI format, or a new DCI format for sPDSCH may be defined. Likewise, if sPDCCH carries UL grant, information on a time duration spanned by PUSCH corresponding to the UL grant should be signaled. It is more so if UL grant carried by sPDCCH can be UL grant of PUSCH or UL grant of sPUSCH. The TTI length of the data channel scheduled by sPDCCH may be notified to the UE by various methods. For example, the TTI length of the data channel is defined in accordance with MCS value by enlarging the MCS table (e.g., Table 10) and varying MCS value of short/default TTI, short/default TTI of the corresponding data channel is indicated by one bit, or the TTI length of the corresponding data channel may be notified to the UE by several bits if TTI lengths more than 2 are supported. The TTI length of the data channel may be used to calculate TBS. For example, the number of PRBs allocated to the data channel may be calculated based on 'floor ('the number of allocated RBs'*'short TTI size of PDSCH'/'default TTI of PDSCH'). TTI length used for initial transmission and TTI length used for corresponding retransmission may be the same as or different from each other. If the TTI length used for initial transmission and the TTI length used for corresponding retransmission are different from each other, a modulation scheme may not be changed. Reserved bits may be given to the MCS table to express that the TTI length is changed. In this case, it may be assumed that a coding rate is changed depending on a TTI size.

sPDCCH for sPDSCH transmitted at the first slot may be transmitted in the legacy PDCCH region (control region of FIG. 3), and sPDCCH for sPDSCH transmitted at the second slot may be transmitted using a specific resource of the second slot. The legacy PDCCH may be used as sPDCCH at the first slot. In this case, information indicating that the corresponding PDCCH is sPDCCH for short TTI is specified in the corresponding PDCCH. For example, PDCCH within the legacy PDCCH region may be used for scheduling of the legacy PDSCH/PUSCH or scheduling of sPDSCH/sPUSCH. In this case, information indicating that PDCCH relates to PDSCH/PUSCH or sPDSCH/sPUSCH may be added to the legacy DCI format, or a new DCI format for sPDSCH/sPUSCH may be defined. For example, PDCCH generated with a new DCI format may be transmitted in the legacy PDCCH region, and PDCCH of the new DCI format may schedule sPDSCH.

Figure 7:
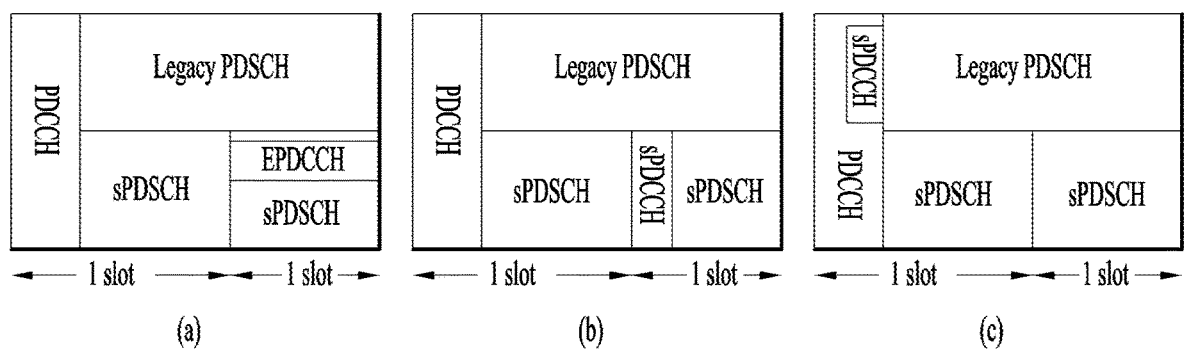
FIG. 7 illustrates sPDCCH at a second slot of a subframe and transmission of a corresponding sPDSCH.

FIG. 7 illustrates sPDCCH at a second slot of a subframe and transmission of a corresponding sPDSCH.

sPDCCH at the second slot may be transmitted in accordance with one of the following methods.

1. Referring to FIG. 7(a), sPDCCH may be transmitted in the form of spanning a time duration by using a specific frequency resource within the second slot. For example, EPDCCH of 0.5 ms TTI may be used as sPDCCH.

2. Referring to FIG. 7(b), sPDCCH may be transmitted using a specific time duration starting from the time when the second slot starts, wherein the sPDCCH may be transmitted by spanning a frequency band on which sPDSCH is transmitted.

3. Referring to FIG. 7(c), both sPDCCHs for sPDSCH of the first slot and sPDSCH of the second slot may be transmitted in the legacy PDCCH region. If a slot to which sPDCCH, which is a control channel for sPDSCH, corresponds is notified to the UE, two sPDCCHs for two sPDSCHs respectively transmitted at two slots may be transmitted at the first slot. The UE may monitor PDCCH/sPDCCH at the first slot only, and may not search for its data channel at the second slot if there is no channel scheduled at the second slot.

4. Both sPDCCH at the first slot and sPDCCH at the second slot may be transmitted in the form of EPDCCH of 0.5 ms TTI.

PDCCH and PDSCH may be transmitted/received on the same PRB set but may be transmitted/received on different PRB sets like the frequency division multiplexing (FDM) scheme.

PDCCH of short TTI may be transmitted/received in the format of PDCCH or EPDCCH. This is an option that may be considered without increasing capabilities (e.g., blind decoding times, etc.) of the UE for supporting short TTI or to reduce latency. In this case, it may be assumed that a separate tail-biting convolution code (TBCC) for decoding PDCCH or EPDCCH further exists for short TTI.

<D. UE Capability Report>

The UE reports its capability related information to the eNB. The UE capability may be reported by designating a UE category and signaling the designated UE category to the eNB. The UE category defines UL/DL capability of the UE. The UE category is determined by UL and DL physical layer parameters.

DL parameters of the UE category may include the maximum number of DL-SCH transport block bits received within one TTI, a total number of soft channel bits, and the maximum number of layers supported for spatial multiplexing in DL.

Specifically, the UE category defines combined UL and DL capabilities. Table 12 and Table 13 respectively illustrate Table 4.1-1 and Table 4.1-2 of 3GPP TS 36.306. In Table 12, downlink physical layer parameter values for a specific UE category are defined. In Table 13, uplink physical layer parameter values for the specific UE category are defined. A UE which indicates category 6 or 8 also indicates category 4. A UE which indicates category 8 also indicates category 5. A UE which indicates category 9 also indicates categories 6 and 4. A UE which indicates category 10 also indicates categories 7 and 4. A UE which indicates category 11 also indicates categories 9, 6 and 4. A UE which indicates category 12 also indicates categories 10, 7 and 4. Table 14 illustrates Table 4.1-4 of 3GPP TS 36.301, which defines minimum capability for the maximum number of bits of a multicast channel (MCH) transport block received within TTI capable for multimedia broadcast/multicast service (MBMS).

TABLE 12

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers, 64 QAM) 75376 (2 layers, 64 QAM) | 3654144 | 2 or 4 |
| Category 7 | 301504 | 149776 (4 layers, 64 QAM) 75376 (2 layers, 64 QAM) | 3654144 | 2 or 4 |
| Category 8 | 2998560 | 299856 | 35982720 | 8 |
| Category 9 | 452256 | 149776 (4 layers, 64 QAM) 75376 (2 layers, 64 QAM) | 5481216 | 2 or 4 |
| Category 10 | 452256 | 149776 (4 layers, 64 QAM) 75376 (2 layers, 64 QAM) | 5481216 | 2 or 4 |
| Category 11 | 603008 | 149776 (4 layers, 64 QAM) 195816 (4 layers, 256 QAM) 75376 (2 layers, 64 QAM) 97896 (2 layers, 256 QAM) | 7308288 | 2 or 4 |
| Category 12 | 603008 | 149776 (4 layers, 64 QAM) 195816 (4 layers, 256 QAM) 75376 (2 layers, 64 QAM) 97896 (2 layers, 256 QAM) | 7308288 | 2 or 4 |

NOTE 1:
In carrier aggregation operation, the DL-SCH processing capability can be shared by the UE with that of MCH received from a serving cell.
If the total eNB scheduling for DL-SCH and an MCH in one serving cell at a given TTI is larger than the defined processing capability, the prioritization between DL-SCH and MCH is left up to UE implementation.

TABLE 13

| UE Category | Maximum number of UL-SCH transport block bits transmitted within a TTI | Maximum number of bits of an UL-SCH transport block transmitted within a TTI | Support for 64 QAM in UL |
|---|---|---|---|
| Category 1 | 5160 | 5160 | No |
| Category 2 | 25456 | 25456 | No |
| Category 3 | 51024 | 51024 | No |
| Category 4 | 51024 | 51024 | No |
| Category 5 | 75376 | 75376 | Yes |
| Category 6 | 51024 | 51024 | No |
| Category 7 | 102048 | 51024 | No |
| Category 8 | 1497760 | 149776 | Yes |
| Category 9 | 51024 | 51024 | No |
| Category 10 | 102048 | 51024 | No |
| Category 11 | 51024 | 51024 | No |
| Category 12 | 102048 | 51024 | No |

TABLE 14

| UE Category | Maximum number of bits of a MCH transport block received within a TTI |
|---|---|
| Category 1 | 10296 |
| Category 2 | 51024 |
| Category 3 | 75376 |
| Category 4 | 75376 |
| Category 5 | 75376 |
| Category 6 | 75376 |
| Category 7 | 75376 |
| Category 8 | 75376 |
| Category 9 | 75376 |
| Category 10 | 75376 |
| Category 11 | 75376 (64 QAM) 97896 (256 QAM) |
| Category 12 | 75376 (64 QAM) 97896 (256 QAM) |

DL capability and UL capability of the UE may be defined respectively by UE DL category and UE UL category. For example, the UE DL/UL categories define DL/UL physical layer parameter values for each UE DL/UL. Table 15 and Table 16 respectively illustrate Table 4.1A-1 and Table 4.1A-2 of 3GPP TS 36.306. Table 15 illustrates DL physical layer parameter values by means of the UE DL category, and Table 16 illustrates UL physical layer parameter values by means of the UE UL category.

TABLE 15

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| DL Category 0 (Note 2) | 1000 | 1000 | 25344 | 1 |
| DL Category 6 | 301504 | 149776 (4 layers, 64 QAM)<br>75376 (2 layers, 64 QAM) | 3654144 | 2 or 4 |
| DL Category 7 | 301504 | 149776 (4 layers, 64 QAM)<br>75376 (2 layers, 64 QAM) | 3654144 | 2 or 4 |
| DL Category 9 | 452256 | 149776 (4 layers, 64 QAM)<br>75376 (2 layers, 64 QAM) | 5481216 | 2 or 4 |
| DL Category 10 | 452256 | 149776 (4 layers, 64 QAM)<br>75376 (2 layers, 64 QAM) | 5481216 | 2 or 4 |
| DL Category 11 | 603008 | 149776 (4 layers, 64 QAM)<br>195816 (4 layers, 256 QAM)<br>75376 (2 layers, 64 QAM)<br>97896 (2 layers, 256 QAM) | 7308288 | 2 or 4 |
| DL Category 12 | 603008 | 149776 (4 layers, 64 QAM)<br>195816 (4 layers, 256 QAM)<br>75376 (2 layers, 64 QAM)<br>97896 (2 layers, 256 QAM) | 7308288 | 2 or 4 |
| DL Category 13 | 391632 | 195816 (4 layers, 256 QAM)<br>97896 (2 layers, 256 QAM) | 3654144 | 2 or 4 |
| DL Category 14 | 3916560 | 391656 (8 layers, 256 QAM) | 47431680 | 8 |
| DL Category 15 | 749856-798800 (Note 3) | 149776 (4 layers, 64 QAM)<br>195816 (4 layers, 256 QAM)<br>75376 (2 layers, 64 QAM)<br>97896 (2 layers, 256 QAM) | 9744384 | 2 or 4 |
| DL Category 16 | 978960-1051360 (Note 3) | 149776 (4 layers, 64 QAM)<br>195816 (4 layers, 256 QAM)<br>75376 (2 layers, 64 QAM)<br>97896 (2 layers, 256 QAM) | 12789504 | 2 or 4 |

NOTE 1:
In carrier aggregation operation, the DL-SCH processing capability can be shared by the UE with that of MCH received from a serving cell.
If the total eNB scheduling for DL-SCH and an MCH in one serving cell at a given TTI is larger than the defined processing capability, the prioritization between DL-SCH and MCH is left up to UE implementation.

NOTE 2:
Within one TTI, a UE indicating category 0 shall be able to receive up to 1000 bits for a transport block associated with C-RNTI/Semi-Persistent Scheduling C-RNTI/P-RNTI/SI-RNTI/RA-RNTI and up to 2216 bits for another transport block associated with P-RNTI/SI-RNTI/RA-RNTI.

NOTE 3:
The UE indicating category x shall reach the value within the defined range indicated by "Maximum number of DL-SCH transport block bits received within a TTI" of category x. The UE shall determine the required value within the defined range indicated by "Maximum number of DL-SCH transport block bits received within a TTI" of the corresponding category, based on its capabilities (i.e. CA band combination, MIMO, Modulation scheme).

TABLE 16

| UE UL Category | Maximum number of UL-SCH transport block bits transmitted within a TTI | Maximum number of bits of an UL-SCH transport block transmitted within a TTI | Support for 64 QAM in UL |
|---|---|---|---|
| UL Category 0 | 1000 | 1000 | No |
| UL Category 3 | 51024 | 51024 | No |
| UL Category 5 | 75376 | 75376 | Yes |
| UL Category 7 | 102048 | 51024 | No |
| UL Category 8 | 1497760 | 149776 | Yes |
| UL Category 13 | 150752 | 75376 | Yes |

The following Table illustrates Table 4.1A-6 of 3GPP TS 36.306, especially a combination set of DL/UL categories supported by the UE DL category and the UE UL category and UE categories which will be indicated.

TABLE 17

| UE DL Category | UE UL Category | UE categories |
|---|---|---|
| DL Category 0 | UL Category 0 | N/A |
| DL Category 6 | UL Category 5 | Category 6, 4 |

TABLE 17-continued

| UE DL Category | UE UL Category | UE categories |
|---|---|---|
| DL Category 7 | UL Category 13 | Category 7, 4 |
| DL Category 9 | UL Category 5 | Category 9, 6, 4 |
| DL Category 10 | UL Category 13 | Category 10, 7, 4 |
| DL Category 11 | UL Category 5 | Category 11, 9, 6, 4 |
| DL Category 12 | UL Category 13 | Category 12, 10, 7, 4 |
| DL Category 13 | UL Category 3 | Category 6,4 |
| DL Category 13 | UL Category 5 | Category 6, 4 |
| DL Category 13 | UL Category 7 | Category 7, 4 |
| DL Category 13 | UL Category 13 | Category 7, 4 |
| DL Category 14 | UL Category 8 | Category 8, 5 |
| DL Category 15 | UL Category 3 | Category 11, 9, 6, 4 |
| DL Category 15 | UL Category 5 | Category 11, 9, 6, 4, DL Category 11 and UL Category 5 |
| DL Category 15 | UL Category 7 | Category 12, 10, 7, 4 |
| DL Category 15 | UL Category 13 | Category 12, 10, 7, 4, DL Category 12 and UL Category 13 |
| DL Category 16 | UL Category 3 | Category 11, 9, 6, 4 |
| DL Category 16 | UL Category 5 | Category 11, 9, 6, 4, DL Category 11 and UL Category 5 |
| DL Category 16 | UL Category 7 | Category 12, 10, 7, 4 |
| DL Category 16 | UL Category 13 | Category 12, 10, 7, 4, DL Category 12 and UL Category 13 |

In Table 12 and Table 15, the maximum number of bits of a DL-SCH transport block received within a TTI means the maximum number of bits of DL-SCH that may be processed by the UE within one TTI. In this case, maximum modulation order information that may be supported by the UE is also included in the maximum number of bits. In DL, the UE may receive cell-specific DL-SCH while receiving UE-specific DL-SCH. Therefore, the UE reports the maximum number of bits (e.g., see Table 11) of UE-specific DL-SCH and the maximum number of bits (e.g., see Table 14) of cell-specific DL-SCH.

When the UE for supporting short TTI reports its UL/DL categories, the UE may report whether to support UL short TTI or whether to support DL short TTI. Support of short TTI means that data/control information of a time unit shorter than normal TTI may be encoded/decoded physically and data/control information of a specific amount may be encoded/decoded within the short TTI.

Therefore, if a UE of a specific category may support short TTI and the short TTI is configured, the UE may report, to the eNB, a maximum DL/UL-SCH size that can be decoded/encoded by the UE within the time when there is no problem in operation of the short TTI.

The following Table illustrates a UE category report by means of the UE for supporting the short TTI.

TABLE 18

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 5 | 299552 | 149776 K1 (K1 < 149776, K1 is integer, if short TTI is configured) and maximum number of a DL-SCH transport block received within short TTI is M1 (M1 < 149776, M1 is integer, if short TTI is configured) | 3667200 | 4 |

TABLE 19

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 6 | 301504 | 149776 (4 layers, 64 QAM) K2 (2 layers, 64 QAM if short TTI is configured and maximum DL-SCH transport block received within short TTI is | 3654144 | 2 or 4 |

TABLE 19-continued

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| | | M2 (2 layers, 64 QAM) 75376 (2 layers, 64 QAM) | | |

TABLE 20

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category | 603008 | 149776 (4 layers, 64 QAM)<br>K3 (2 layers, 64 QAM if short TTI is configured and maximum DL-SCH transport block received within short TTI is M3 (2 layers, 64 QAM)<br>195816 (4 layers, 256 QAM)<br>K4 (4 layers, 128 QAM if short TTI is configured and maximum DL-SCH transport block received within short TTI is M4 (4 layers, 64 QAM)<br>75376 (2 layers, 64 QAM)<br>K5 (2 layers, 64 QAM if short TTI is configured and maximum DL-SCH transport block received within short TTI is M5 (1 layers, 64 QAM)<br>97896 (2 layers, 256 QAM)<br>K6 (2 layers, 128 QAM if short TTI is configured and maximum DL-SCH transport block received within short TTI is M6 (2 layers, 64 QAM) | 7308288 | 2 or 4 |

Referring to Table 15 and Tables 18 to 20, the category report according to Tables 18 to 20 may further include information of K1, K2, K3, K4, K5 and K6 in addition to values of categories 5, 6 and 12 as compared with the category report according to Table 15.

The UE may report its category/capability while sharing the decoding/encoding capability with its another capability. Decoding/encoding capability of the UE is associated with the time required to complete decoding/encoding for data of specific amount or the amount of data that may be decoded/encoded within a given time. If the number of MIMO layers is increased and the number of aggregated carriers is increased, the time required for the UE to process the corresponding data is also increased. If CA/MIMO is not configured for a UE having specific CA capability and specific MIMO capability, the UE may use data processing capability for CA and MIMO to support sTTI.

Option 1. When short TTI is configured, maximum DL-SCH/UL-SCH bits per TTI are shared at short TTI and normal TTI.

For example, referring to Table 18, the maximum number of bits that may be received by the UE having a category 5 is 149776, and if short TTI is configured, the maximum number of bits that may be received in normal TTI is decreased as compared with the case that the short TTI is not configured. In accordance with decoding capability of the UE, the maximum number of bits that may be received for short TTI is set to a value smaller than the maximum number of bits that may be received when short TTI is not configured.

Likewise, the number of bits that may be transmitted for short TTI is separately set for the maximum number of bits of UL-SCH transport block transmitted within a TTI in the same manner as DL.

Option 2. When short TTI is configured, maximum DL-SCH/UL-SCH bits per TTI are shared with MIMO capability.

For example, referring to Table 18 to Table 20, the maximum number of MIMO layers that may be supported when short TTI is configured is reduced as compared with the maximum number of MIMO layers that may be supported when short TTI is not configured, whereby processing of normal TTI and DL-SCH/UL-SCH transmitted/received with normal TTI may be enabled. For example, if short TTI is configured for a LIE which supports maximum 4 layers, the number of layers that may be transmitted/received in normal TTI is limited to two layers, and the maximum number of bits that may be transmitted/received is reduced. Likewise, the number of layers and bits that may be transmitted/received by the UE in normal TTI may be determined. If short TTI is configured, some (e.g., decoding capability) of MIMO capabilities for normal TTI when the short TTI is not used may be reduced and used for short TTI.

Option 3. When short TTI is configured, a maximum modulation order that may be supported is reduced.

In the same manner as MIMO capabilities, a modulation order of the UE may be limited to support short TTI. For example, if a maximum modulation order that may be supported when short TTI is not configured is 256 QAM, the modulation order that may be supported in normal TTI when short TTI is configured is reduced to 128 QAM, and bits and modulation order, which may be supported at short TTI, may be determined.

Option 4. The number of carriers subjected to carrier aggregation (CA) is limited.

Similarly to MIMO capabilities, the number of carriers that may support normal TTI when short TTI is configured may be limited as compared with the number of carriers that may support normal TTI when short TTI is not configured. For example, some of the maximum number of carriers may be used for normal TTI, and the other carriers may be used for sTTI. If the maximum number of bits that may be supported by the UE is defined in a general status, some capability may be limited within given capability when short TTI is configured, whereby short TTI may be supported. Therefore, the UE may simultaneously encode/decode UL-SCH/DL-SCH transmitted/received at short TTI and normal TTI.

<E. UE Behavior Based on UE Capability>

If a UE which additionally supports TTI of a length different from that of normal TTI exists in a system that basically supports the normal TTI, default capability of the UE supports the normal TTI in the corresponding system. A UE which may support all of TTIs of different lengths in addition to normal TTI reports its TTI capability to the eNB. The UE may report information as to whether TTI of different lengths in addition to normal TTI may be supported and information as to how many different lengths of TTI may be supported. That is, the UE may report TTI length and type that can be supported by the UE. Information as to TTI length supported by the UE may be reported by report of buffering capability of the UE or the number of buffers, decoding capability, and multiplexing/demultiplexing capability.

For example, the UE may have to receive or decode PDSCH transmitted with normal TTI and sPDSCH transmitted with short TTI at the same time. In this case, the UE should receive/store PDSCH of normal TTI and sPDSCH of short TTI in at least two or more buffers and demodulate/decode the received/stored PDSCH and sPDSCH. This is associated with how many codewords may be received by the UE. Also, this is associated with carrier aggregation (CA) capability of the UE. MIMO capability and CA capability of the UE and support capability of different TTI lengths of the UE may be shared within UE entire data processing capabilities to avoid unnecessary complexity increase of the UE and fail to forcedly increase UE capability. To support different TTI lengths for the UE, a limitation may be applied to TBS transmitted at TTI of different lengths in addition to normal TTI.

In a system that supports TTI of different lengths, if the network or the eNB performs scheduling for the UE while dynamically switching different TTI lengths, the UE may receive a plurality of data channels of different TTI lengths at the same time. Alternatively, if the UE receives sPDSCH of short TTI immediately after receiving PDSCH of normal TTI, the time when decoding of the sPDSCH starts may be delayed due to the time when the UE receives and decodes PDSCH. If PDSCH decoding of a short time unit is delayed due to PDSCH decoding of a long time unit, advantages in using the short TTI may be reduced. If decoding timing of PDSCH in normal TTI is overlapped with decoding timing of sPDSCH at short III, PDSCH and sPDSCH may be processed differently from each other depending on UE capability.

Figure 8:
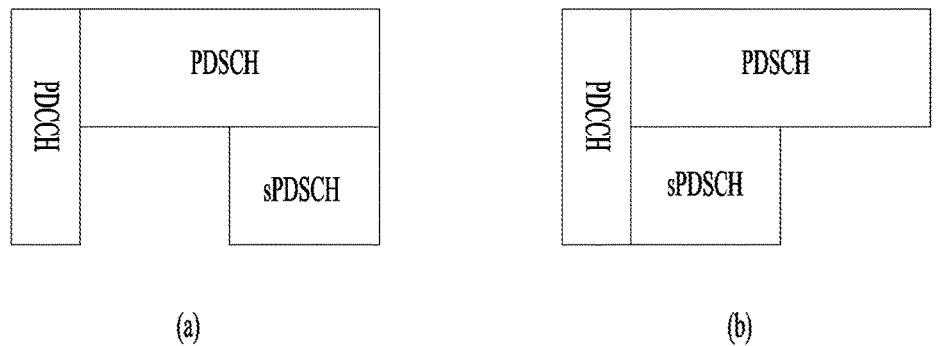
FIG. 8 illustrates a method for processing data channels of different TTI lengths in accordance with the present invention.

FIG. 8 illustrates a method for processing data channels of different TTI lengths in accordance with the present invention.

Data channels transmitted with different TTI lengths are illustrated in FIG. 8. The case that the UE receives data channels of different lengths may be divided into two cases. The following cases will be described based on two different TTI lengths of normal TTI and short TTI as examples.

Case 1. As shown in FIG. 8(*a*), sPDSCH may be received in the UE while PDSCH of normal TTI is being received.

Case 2. As shown in FIG. 8(*b*), reception of PDSCH of normal TTI and reception of sPDSCH of short TTI may be started in the UE at the same time.

If one UE may decode a plurality of data channels within a given time by receiving the data channels at the same time and generate and transmit A/N for the plurality of data channels and uplink control/data channels. The UE reports, to the eNB, whether to support transmission and reception of the plurality of data channels at the same time. For example, if the UE includes a plurality of buffers and a plurality of turbo decoders for decoding of the data channels or is able to decode the plurality of data channels within a given time of a speed of a UE processor, it may be determined that the UE has capability that may support the plurality of data channels at the same time.

The UE is able to support different TTI lengths but is not able to receive and decode massive data channels at the same time. That is, the UE is able to support different TTI lengths but is not able to receive a plurality of data channels within a given time and transmit an uplink channel in response to the received data channels. The UE reports information on this case to the eNB. If the UE supports different TTI lengths but is not able to process the plurality of data channels at the same time, it is preferable that PDSCH of normal TTI and sPDSCH of short TTI are not scheduled at the same time. However, as shown in FIG. 8, sPDSCH of short TTI may be transmitted to the corresponding UE in the middle of transmitting PDSCH of normal TTI. In this case, if the corresponding UE has capability that cannot decode PDSCH and sPDSCH at the same time, agreement between the UE and the eNB is required for processing of PDSCH signal and sPDSCH signal, which are received at the same time. One of the following schemes may be considered as the agreement.

Scheme 1. A priority between PDSCH and sPDSCH is notified to the UE. Alternatively, the UE may be assumed that sPDSCH or PDSCH has a specific priority without separate signaling. For example, since it is likely that low latency data may be transmitted in sPDSCH, the UE may be assumed that sPDSCH always has a priority higher than PDSCH. The eNB may determine a downlink data channel to which PUCCH/sPUSCH received therein relates, on the basis of this assumption.

A. Case that sPDSCH has a Priority

A scheme that sPDCCH has a priority may be applied to even the case that PDSCH and sPDSCH have been scheduled to the UE at the same time as shown in FIG. 8(*b*).

If the UE receives sPDSCH in the middle of receiving PDSCH, the UE stops decoding of the PDSCH and transmits NACK signal for the PDSCH to the eNB, flushes a buffer which stores the PDSCH, buffers the sPDSCH, performs decoding of the sPDSCH and transmits A/N for the sPDSCH. Alternatively, the UE stops decoding of the PDSCH but does not flush the buffer, and may continue to decode the PDSCH which is the lower priority data if decoding of sPDSCH having a higher priority is completed.

The eNB which has received NACK knows that the NACK is a NACK for PDSCH and again schedules downlink data carried by the PDSCH. If decoding of lower priority data is not completed within a normal time, the UE transmits NACK. If decoding of the PDSCH is successfully resumed after decoding of higher priority data is completed, and if the UE can meet transmission timing of PUCCH carrying A/N for the PDSCH, the UE may transmit ACK at the PUCCH transmission timing. If the eNB knows that NACK is reported due to UE decoding capability, the eNB may transmit PDCCH only instead of retransmission. In other words, the eNB may actually transmit PDCCH only instead of retransmitting PDSCH. For example, if NACK is reported from the UE due to a limitation of UE decoding capability, the eNB may transmit DCI having no resource allocation information through PDCCH or sPDCCH. The UE may transmit A/N by using PUCCH resource determined by CCE index of the PDCCH at a UL subframe associated with DL subframe at which PDCCH having no resource allocation information exists. That is, PDCCH having no resource allocation information may be transmitted to the UE to configure A/N PUCCH resource. The UE which has received PDCCH carrying DCI having no resource allocation information or PDCCH carrying the same scheduling information as scheduling information for previous PDSCH at a subframe n may transmit A/N according to decoding of the previous PDSCH at a subframe n+k or TTI n+k.

B. Case that PDSCH has a Priority

If the UE receives sPDSCH in the middle of receiving PDSCH, the UE transmits NACK for sPDSCH newly arrived and transmits A/N for the PDSCH after completely decoding the PDSCH.

The eNB which has received NACK knows that the corresponding NACK is a NACK for sPDSCH, and retransmits sPDSCH. The eNB may again schedule the sPDSCH. If the NACK is transmitted due to UE decoding capability, the network transmits DCI instead of actually retransmitting sPDSCH, whereby the UE may transmit A/N for a decoding result of sPDSCH.

The scheme that PDSCH has a priority may be applied to even the case that PDSCH and sPDSCH have been scheduled to the UE at the same time as shown in FIG. 8(b).

C. The UE may be assumed that a data channel which has been arrived later always has a priority. If sPDSCH arrives at the UE while the UE is receiving the PDSCH, the sPDSCH has a priority. The UE stops decoding of the PDSCH which is previously received, transmits NACK, and decodes the sPDSCH. By contrast, if PDSCH reaches the UE while the UE is receiving sPDSCH, the PDSCH has a priority, and the UE stops decoding of sPDSCH which is previously received, transmits NACK, and decodes the PDSCH.

D. The UE may process both PDSCH and sPDSCH in accordance with a transmission timing if possible. A priority may be given to sPDSCH if the UE is not able to process both PDSCH and sPDSCH. That is, the UE may determine whether to decode both PDSCH and sPDSCH or whether to decode sPDSCH only in accordance with UE implementation.

E. A flag of data having a priority may be provided to the UE through DCI. The UE may stop current decoding and give a priority to new data having a flag. Alternatively, for such priority data transmission, a separate decoder and processing logic may be introduced. The separate decoder and processing logic may be shared with common data (e.g., common control signal of SIB). For example, since the common control signal of SIB has a limitation in size, the UE may decode PDSCH carrying SIB and sPDSCH of sTTI at the same time by using the separate decoder and processing logic. Alternatively, data marked with a high priority by a flag has a priority as compared with common data.

Generally, the UE may stop decoding of low priority data and transmit NACK for the low priority data. However, in A to E of the scheme 1, the UE may suspend decoding of the low priority data and process high priority data and then resume decoding of the low priority data instead of transmitting NACK for the low priority data. In this case, if decoding of data is successfully performed, the UE may deliver data to a higher layer and additionally transmit ACK to the eNB.

Scheme 2. The UE is able to decode a plurality of data channels at the same time in accordance with TBS. The network may allow the UE to decode PDSCH of high capacity and sPDSCH of low capacity at the same time by giving a limitation to TBS transmitted through sPDSCH.

F. In case of the scheme 2, the eNB may ensure that TBS of sPDSCH of low capacity has a specific size or less, whereby the UE may decode PDSCH and sPDSCH at the same time. If the eNB notifies the UE that TBS of sPDSCH has a specific size or less, the UE which has received PDSCH and sPDSCH at the same time may decode both the PDSCH and the sPDSCH and perform UL transmission for the decoded PDSCH and sPDSCH. In the legacy LTE/LTE-A system, if (UE-specific) PDSCH which is scheduled and PDSCH carrying SIB for delivering system information are transmitted to a specific UE, the UE may decode the two PDSCHs (UE-specific PDSCH and cell-specific PDSH) within the same subframe at the same time. Since the system information has TBS smaller than that of the data channel, parallel decoding may be performed. However, even in this case, while the UE-specific PDSCH is transmitted to the UE, cell-specific PDSCH and sPDSCH to the UE should not be transmitted within one normal TTI. That is, three PDSCHs of UE-specific PDSCH, cell-specific PDSCH and sPDSCH cannot exist at one subframe. Also, the UE may drop data of the UE capability or more and notify the eNB of the dropped data.

G. The UE may determine whether to decode the plurality of data channels at the same time. If the UE receives sPDSCH in the middle of receiving PDSCH, the UE may first decode sPDCCH for the sPDSCH and then determine whether to be able to decode PDSCH and sPDSCH at the same time. For example, if the UE receives sPDSCH in the middle of receiving PDSCH, the UE first decodes a control channel of sPDCCH. At this time, the UE acquires TBS information of the sPDSCH from the sPDCCH, and if the UE is able to sufficiently decode the sPDSCH together with PDSCH, the UE decodes the PDSCH and the sPDSCH at the same time. However, if TBS of the sPDSCH acquired from the control information of the sPDSCH is too big, the UE performs the operation of the aforementioned scheme 1 in accordance with priority information signaled by the eNB.

For example, if the eNB previously signals information indicating that sPDSCH has a priority, the UE may stop decoding of the PDSCH, transmit NACK for the PDSCH and first perform decoding of the sPDSCH.

Scheme 3. A limitation may be given to TBS of PDSCH. The eNB may ensure, for a UE for which short TTI is configured, that TBS of a specific size or less is only scheduled during PDSCH transmission to the UE. The UE, for which short TTI is configured, may assume that a maximum value of TBS of PDSCH transmitted with normal TTI is limited to a specific size or less. Therefore, if sPDSCH and PDSCH are scheduled at the same time, the UE can decode the sPDSCH and the PDSCH at the same time. The maximum size of the PDSCH which is limited may be determined by a size of short TTI at which sPDSCH is transmitted. For example, if PDSCH of normal TTI is transmitted to the UE for which short TTI is configured, a maximum TBS of PDSCH which is able to be transmitted to the UE may be limited to a maximum TBS which is able to be transmitted at short TTI. If it is assumed that a short TTI length is 1/n of a normal TTI length, the maximum TBS which is able to be transmitted at short TTI may be 1/n of TBS which is able to be transmitted by normal TTI. Therefore, if PDSCH of normal TTI is transmitted to the UE for which short TTI is configured, the maximum TBS of the PDSCH may be a value corresponding to 1/n of the maximum TBS which is able to be transmitted by normal TTI. The short/normal TTI and the maximum TBS corresponding to the short/normal TTI may be summarized as follows:

Short TTI length (short TTI)=1/n of normal TTI length (normal_TTI/n), max_TBS_size_normal_TTI: maximum TBS within normal TTI, and if short TTI is configured, max_TBS_size_normal_TTI is restricted as follows:

Maximum IBS of restricted normal TTI (confined_max_TBS_size_normal)≤max_TB S_size_normal_TTI/n.

This restriction may be limited to the case that sPDSCH and PDSCH are simultaneously scheduled to the UE, for which short TTI is configured, at one normal TTI. If short TTI and normal TTI are switched semi-statically, this restriction may be applied while short TTI is being configured, even in the case that PDSCH of normal TTI is only transmitted. That is, the maximum size of PDSCH to the UE may be limited even in the case that PDSCH of normal TTI is only scheduled at a specific time within a time interval when the UE for which short TTI is configured should monitor short TTI.

In the system for supporting different TTI lengths, capability information to be reported by the UE may include information as to whether different TTI lengths are supported and information as to whether a plurality of transport blocks is able to be decoded. For example, the UE may report its TTI length related capability as illustrated in the following Table.

TABLE 21

{ short TTI support,
Number of supported short TTIs per normal TTI,
Maximum size of decodable transport block size in parallel,
...
}

If the maximum size of decodable transport block size in parallel is the maximum transport block size of the legacy PDSCH, the corresponding UE may be a UE that can decode PDSCH and sPDSCH at the same time.

When one UE receives downlink channels having TTIs of different lengths at the same time, the UE operation has been described as above. When downlink TTI lengths are varied, a UE may handle continuously received data channels of different TTI lengths in the same manner as the operation that the UE performs for handling simultaneously received data channels of different TTI lengths.

If the UE receives data in downlink, the UE demodulates and decodes the data, prepares A/N signal indicating that the demodulation and decoding have been successfully performed, and transmits the A/N signal in uplink by encoding the A/N signal. The time required by the UE to decode the received signal is conventionally proportional to a size/amount of the received data. If the UE receives a data channel (hereinafter, sPDSCH1) having TTI of a specific length and then receives sPDSCH (hereinafter, sPDSCH2) of a TTI length shorter than that of sPDSCH which is previously received, since the UE is decoding sPDSCH1, which is previously received and has a relatively long TTI length, the UE cannot decode the sPDSCH2 at the time when the sPDSCH2 is received even though the UE has received sPDSCH2 received at a short TTI length.

Figure 9:
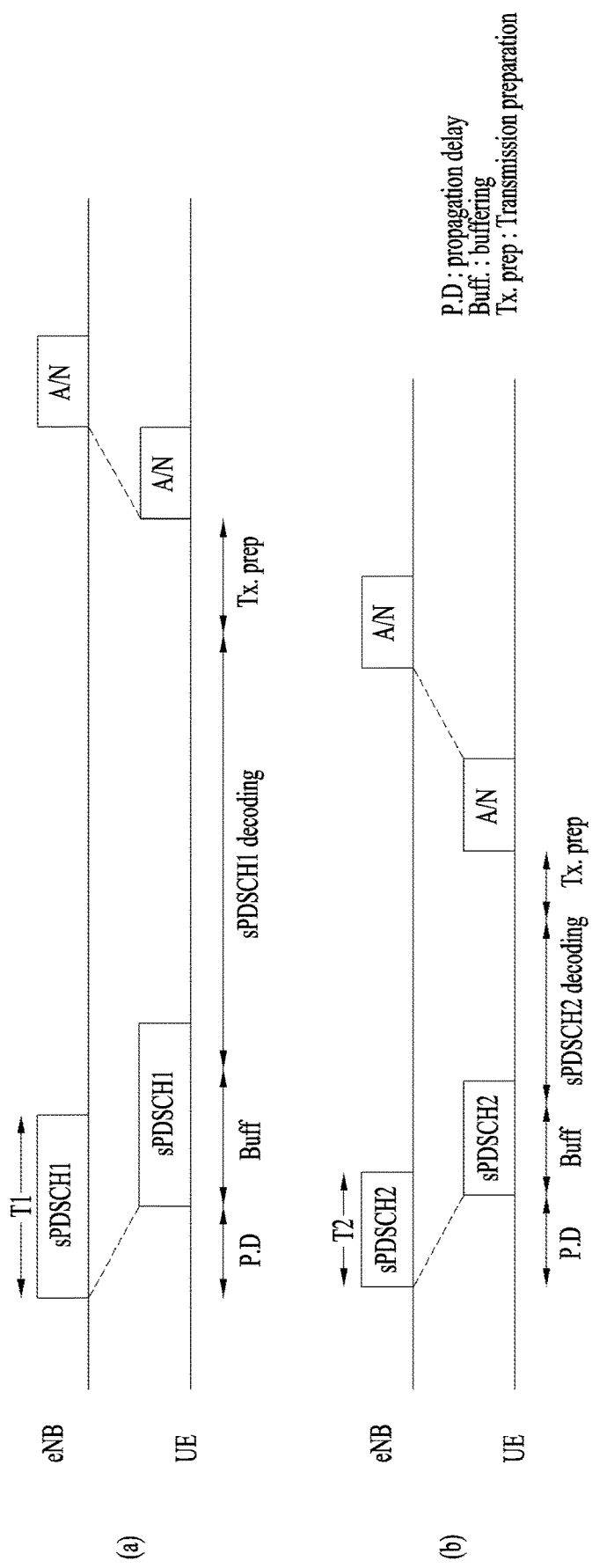
FIG. 9 illustrates a decoding time according to a length of sPDSCH and the time required for a UE to transmit A/N for the sPDSCH.

FIG. 9 illustrates a decoding time according to a length of sPDSCH and the time required for a UE to transmit A/N for the sPDSCH.

Referring to FIG. 9, it is general that the longer sPDSCH TTI length is, the longer the time required for decoding is, and that the shorter sPDSCH TTI length is, the shorter the time required for decoding is. The long TTI length of sPDSCH may mean a big size of data transmitted in sPDSCH, and the short TTI length of sPDSCH may mean a small size of data transmitted in sPDSCH.

Figure 10:
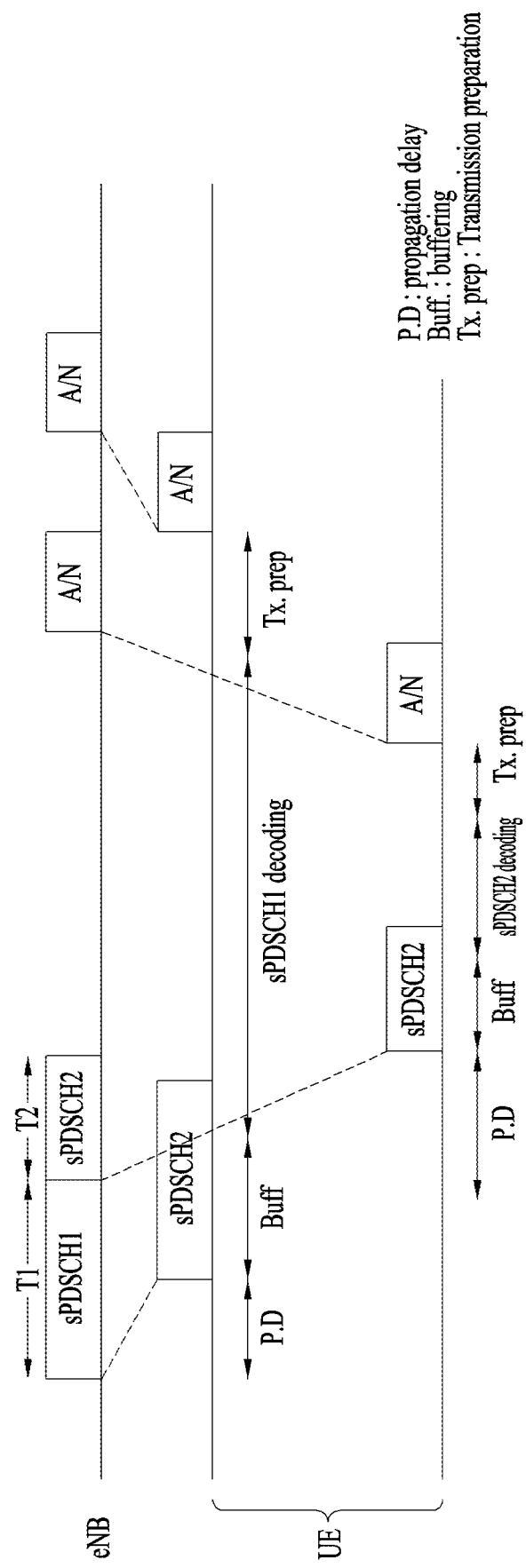
FIGS. 10 to 12 illustrate UE operations according to the present invention when timings for decoding data channels are overlapped.
Figure 11:
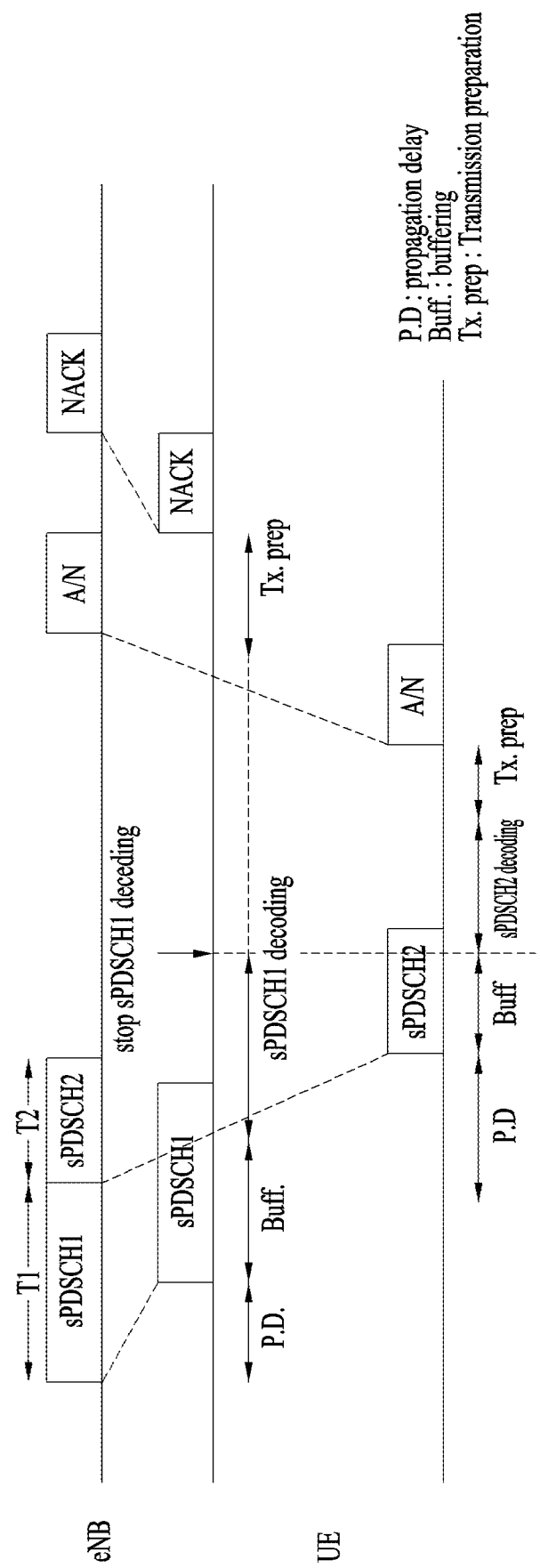
Figure 12:
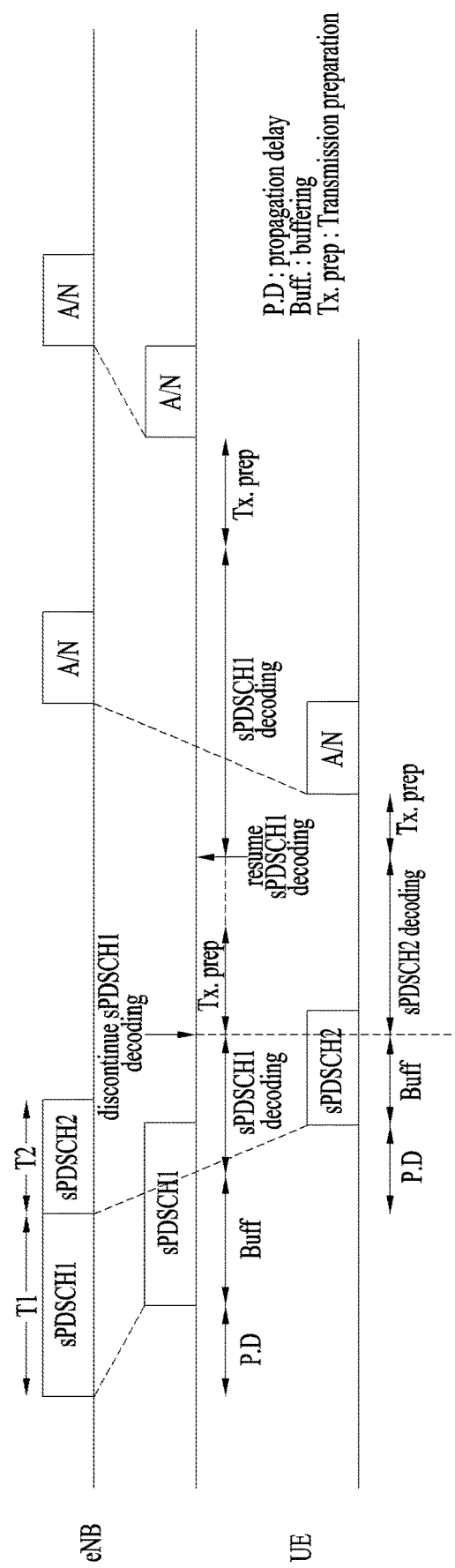

FIGS. 10 to 12 illustrate UE operations according to the present invention when timings for decoding data channels are overlapped. Particularly, FIGS. 10 to 12 illustrate UE operation when one UE continuously receives sPDSCHs and TTI length of sPDSCH1 which is previously received is longer than TTI length of sPDSCH2 which is received later.

Decoding of all of a Plurality of Data Channels

Referring to FIG. 10, if the UE includes a plurality of decoders, for example, the UE may store sPDSCH1 and sPDSCH2 in each buffer of the sPDSCH1 and the sPDSCH2, decode the sPDSCH1 and the sPDSCH2 in parallel, and transmit ACK or NACK information on each of the sPDSCH1 and the sPDSCH2. That is, the UE may decode sPDSCH1 and sPDSCH2 of different TTI lengths. However, if the UE decodes a plurality of channels in parallel, UE complexity and cost may be increased.

For another example, if the UE includes a decoder, which has shortened the time required for decoding, due to good capability, the UE is able to complete decoding of both sPDSCH1 and sPDSCH2 before preparing A/N transmission.

If the UE is able to meet A/N transmission timings for a plurality of channels by decoding the plurality of channels quickly or in parallel, the UE may notify the eNB that a limitation may not be given to PDSCH scheduling to the UE by reporting its capability to the eNB.

If the UE does not include a plurality of decoders and receives sPDSCH2 transmitted with a length shorter than TTI length of sPDSCH1 while sPDSCH1 is being decoded, the UE may simply start decoding of sPDSCH2 after completing decoding of sPDSCH1. In this case, A/N feedback timing of sPDSCH2 is delayed by a decoding time of sPDSCH1 received prior to the sPDSCH.

Considering that various TTI lengths are used, a service provided by PDSCH2 of a TTI length shorter than TTI length applied to sPDSCH1 may be a service required by latency shorter than that of a service provided by sPDSCH1. In this case, it may not be preferable to delay A/N feedback for sPDSCH2. Considering this, it may be regulated that a channel having a short TTI length always has a priority in view of decoding.

However, if the UE receives sPDSCH2 transmitted with a shorter TTI length in the middle of receiving sPDSCH1 and decoding of the sPDSCH2 is prior to decoding of the sPDSCH1, interruption occurs in decoding of the sPDSCH1. Considering this, the eNB may semi-statically notify the UE of a decoding priority among channels, with which reception or decoding timings are overlapped in the UE, through higher layer signaling. Alternatively, the eNB may notify the UE of a priority of a specific channel through separate dynamic signaling. For example, the aforementioned flag indicating a priority may be included in DCI. The UE may assume that decoding of a channel to which the flag is set within DCI has a priority.

Decoding Drop of Specific Channel

Referring to FIG. 11, if the UE receives sPDSCH2 having a decoding time shorter than that of sPDSCH1 and A/N requirement in the middle of decoding sPDSCH1, the UE stops decoding of the sPDSCH1, performs decoding of the sPDSCH2 and transmits A/N for the received result of the sPDSCH2 at a given time without delay. Then, the UE transmits NACK for the sPDSCH1, of which decoding is stopped, at A/N transmission timing of the sPDSCH2, and may improve decoding capability by combining data of the sPDSCH with data received as retransmission data for the sPDSCH1 and decoding the combined data. The UE may transmit A/N for the combined data.

Delay of Decoding

If the UE receives sPDSCH2 having a decoding time shorter than that of sPDSCH1 and A/N requirement in the middle of decoding sPDSCH1, the UE assumes that the sPDSCH2 having a short TTI length has a priority higher than that of sPDSCH1 having a relatively long TTI length. The eNB may construe the A/N information transmitted from the UE by assuming that the UE has first decoded a channel having a short TTI length.

Referring to FIG. 12, the UE stops decoding of the sPDSCH1 and performs decoding of the sPDSCH2, but the UE may again perform decoding of the sPDSCH1 after completing decoding of the sPDSCH2. In this case, the A/N transmission timing of the sPDSCH1 may be more delayed than the timing expected by the eNB at a scheduling timing of the sPDSCH1. The A/N transmission timing of the sPDSCH1 is delayed as much as K TTI2. In this case, TTI2 means a TTI length applied to sPDSCH2. In this case, K may be a positive integer.

On the other hand, if the sPDSCH1 has a priority, a decoding starting timing of the sPDSCH2 and the A/N transmission timing are delayed as much as K TTI 1. In this case, TTI1 means a TTI length applied to the sPDSCH1.

That is, A/N transmission timing of a downlink channel having a low priority is always delayed as much as K TTIs, wherein TTI means a TTI length of a channel having a priority. In this case, K may be a value given in the system or a value separately notified from the eNB to the UE.

The UE stops decoding of the sPDSCH1 and performs decoding of the sPDSCH2, but the UE may again perform decoding of the sPDSCH1 after completing decoding of the sPDSCH2. In this case, in order that the UE transmits A/N for the sPDSCH1 at the A/N transmission timing expected by the UE at the time when the sPDSCH1 is scheduled, decoding of the sPDSCH1 should be completed prior to a certain time from the A/N transmission timing. As decoding of the sPDSCH2 is first performed, decoding of the sPDSCH1 may not be completed within a given time. Therefore, as decoding of the sPDSCH1 is not completed within a given time, the case that the UE should transmit NACK may occur. Therefore, a priority as to decoding may be configured to the UE through dynamic signaling. If a priority application is enabled by dynamic signaling, the UE may suspend decoding which is currently performed.

Alternatively, certain decoding capability is reserved for PDSCH processing of short TTI, and PDSCH of long TTI may be decoded by only decoding capability excluding the reserved decoding capability. In this case, the reserved decoding capability may be signaled to the UE by the network or to the higher layer.

If the UE receives sPDSCH in the middle of PDSCH, it is assumed that the UE stops decoding of the PDSCH, transmits NACK and performs decoding of the sPDSCH. In this case, the UE may empty the PDSCH which is previously received, from the buffer, or may store the PDSCH in the buffer and then be combined with retransmitted data. That is, although there is a data channel previously received, if a data channel which is newly arrived is first decoded, the previously received data may be managed in accordance with one of the following methods.

Method for Emptying the Existing Data from the Buffer

A. When sPDSCH arrives at the UE while the UE is receiving PDSCH, the UE stops decoding of the PDSCH and performs decoding of the sPDSCH.

B. The UE stops decoding of the PDSCH, empties data of the PDSCH from the buffer and transmits NACK to the eNB.

C. When the eNB performs retransmission of data of the PDSCH, since the UE has emptied the data of the PDSCH from the buffer, the eNB sets a new data indicator within a DL grant when transmitting the DL grant, and notifies the UE that downlink data according to the DL grant are new data.

D. The method for emptying the existing data from the buffer is applied to a buffer management system for a data channel having a low priority.

Method for Storing the Existing Data in the Buffer without Emptying.

A. When sPDSCH arrives at the UE while the UE is receiving PDSCH, the UE stops decoding of the PDSCH and performs decoding of the sPDSCH.

B. The UE stops decoding of the PDSCH, generates and transmits NACK for the PDSCH, buffers data of the PDSCH, combines retransmitted data with the buffered data and decodes the combined data.

The aforementioned limited capability of the UE may affect processing of control data. The UE for supporting control channels of different lengths should process control data that require different blind decoding capabilities. In order that the UE may perform blind decoding that requires different blind decoding capabilities, blinding decoding times required for the UE once may be reduced, whereby a latency level may be adjusted to requirements of short TTI. This may mean a restriction of a search space for a control channel, and flexibility of the network may be restricted in accordance with decoding times required for the UE. The UE may be mandated to have decoding capability for control channels of different lengths. Otherwise, the network may be mandated so as not to perform short TTI control channel transmission within a certain time after long TTI control channel transmission. Otherwise, the UE may be configured so as not to monitor a long TTI control channel at a subframe for which short TTI is configured. Otherwise, the network may not allow the UE not to process some channels by performing strict time division multiplexing (TDM).

Even in case of uplink, capability of the UE, such as encoding, may be required additionally to support short TTI. The method of the UE for supporting UL transmission of a plurality of TTI lengths may be similar to the method of the UE for supporting downlink reception of a plurality of TTI lengths.

The UE may assume that UL transmission of short TTI within long/default TTI cannot be switched to UL transmission of long TTI or UL transmission of long TTI cannot be switched to UL transmission of short TTI. UL transmission with short TTI is preferably performed by OFDM/SC-FDM symbols other than OFDM/SC-FDM symbols having DM-RS based on long/default TTI. If UL transmission timing based on short TTI is overlapped with DM-RS transmission position based on long/default TTI, UL transmission (e.g., sPUSCH/sPUCCH) based on short TTI may be dropped.

<F. UL Grant and UL HARQ>

Figure 13:
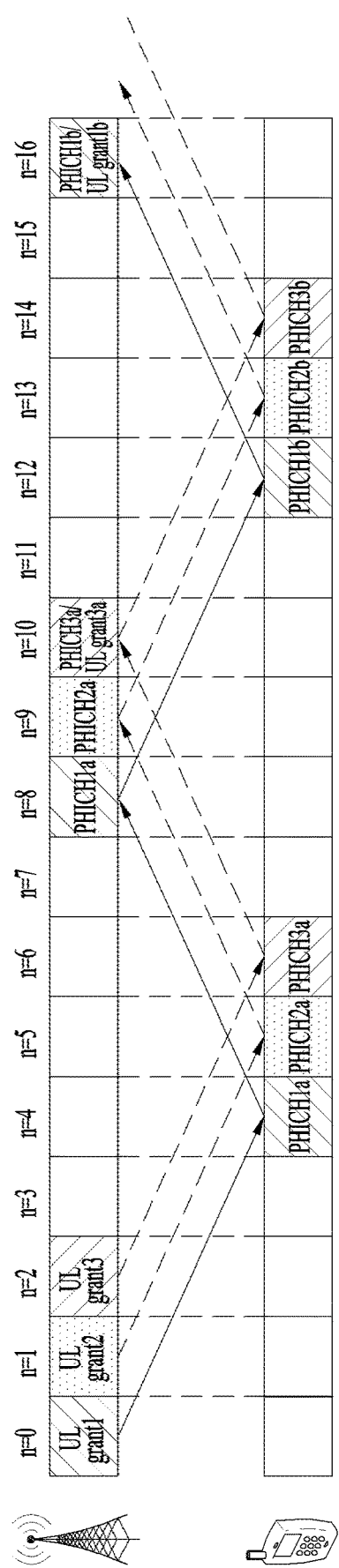
FIG. 13 illustrates synchronous HARQ.

FIG. 13 illustrates synchronous HARQ.

As shown in FIG. 13, retransmission of UL transmission in the current LTE/LTE-A system is operated in a synchronous HARQ scheme. The UE has eight HARQ processes, wherein HARQ is operated independently per process. Synchronous UL HARQ means that the UE which has received UL grant at a subframe n generally transmits its PUSCH at a subframe n+4 by using MCS, RS, etc. according to the UL grant in a frequency resource allocated by the UL grant. A/N for the PUSCH is received through PHICH at a subframe n+8. If the corresponding A/N carried by the PHICH is ACK, the UE empties data of the PUSCH from its buffer. If the corresponding A/N carried by the PHICH is NACK, the UE performs PUSCH retransmission at a subframe n+12 by using the same frequency resource and the same MCS as those of the previous PUSCH transmission. Retransmission performed at a given time using the resource and MCS used for initial transmission will be referred to as non-adaptive HARQ. Unlike this, the eNB may request retransmission by transmitting UL grant to the UE at the time when PHICH is transmitted. In this case, PUSCH retransmission is performed using the resource and MCS allocated by the UL grant. The UL grant may indicate resource and MCS different from those of initial transmission. This will be referred to as adaptive HARQ scheme. In this way, the success probability of data reception may be enhanced by adaptively applying the resource and MCS of the PUSCH. The LTE/LTE-A system supports synchronous non-adaptive/adaptive HARQ in UL. When PHICH and UL grant for the same PUSCH are transmitted at the same subframe, the legacy system prescribes that the UL grant is prior to the PHICH to prevent A/N carried by the PHICH and A/N indicated by the UL grant from being confused with each other. Therefore, the UE is operated as indicated by the UL grant rather than the PHICH. In case of UL grant for retransmission, NDI within DCI for transmitting the UL grant is not toggled unlike a previous NDI for the corresponding data. That is, If UL grant having NDI of the same value as that of the NDI within the UL grant received during initial transmission is received, the UE understands that the DCI is a grant for UL retransmission.

If short TTI and normal TTI coexist, it is required to clarify HARQ process management scheme by means of the UE. If the UE may transmit PUSCH of short TTI and PUSCH of normal TTI at the same time and dynamically switch short TTI and normal TTI, the number of maximum HARQ processes, which can be generated for the UE, may be 16. Therefore, if the number of HARQ processes of the UE is maintained as 8, the UE should appropriately use and share the eight HARQ processes for sPUSCH transmission and PUSCH transmission.

UL grant for scheduling sPUSCH/PUSCH may notify the UE whether the UL grant is for PUSCH or sPUSCH. The UE which has received the UL grant may understand that the UL grant schedules PUSCH of 1 ms as default. However, if there is separate information for TTI length for PUSCH, the UE may transmit PUSCH with the TTI length. In other words, if short TTI of 5 ms is supported in the system, information indicating that PUSCH spans as much as 0.5 ms is included in the UL grant, whereby the UE may be notified that the UL grant is for sPUSCH. The UE which has received the UL grant for sPUSCH may always perform retransmission with sPUSCH. That is, the UE may follow the TTI length indicated by the UL grant even during retransmission.

Figure 14:
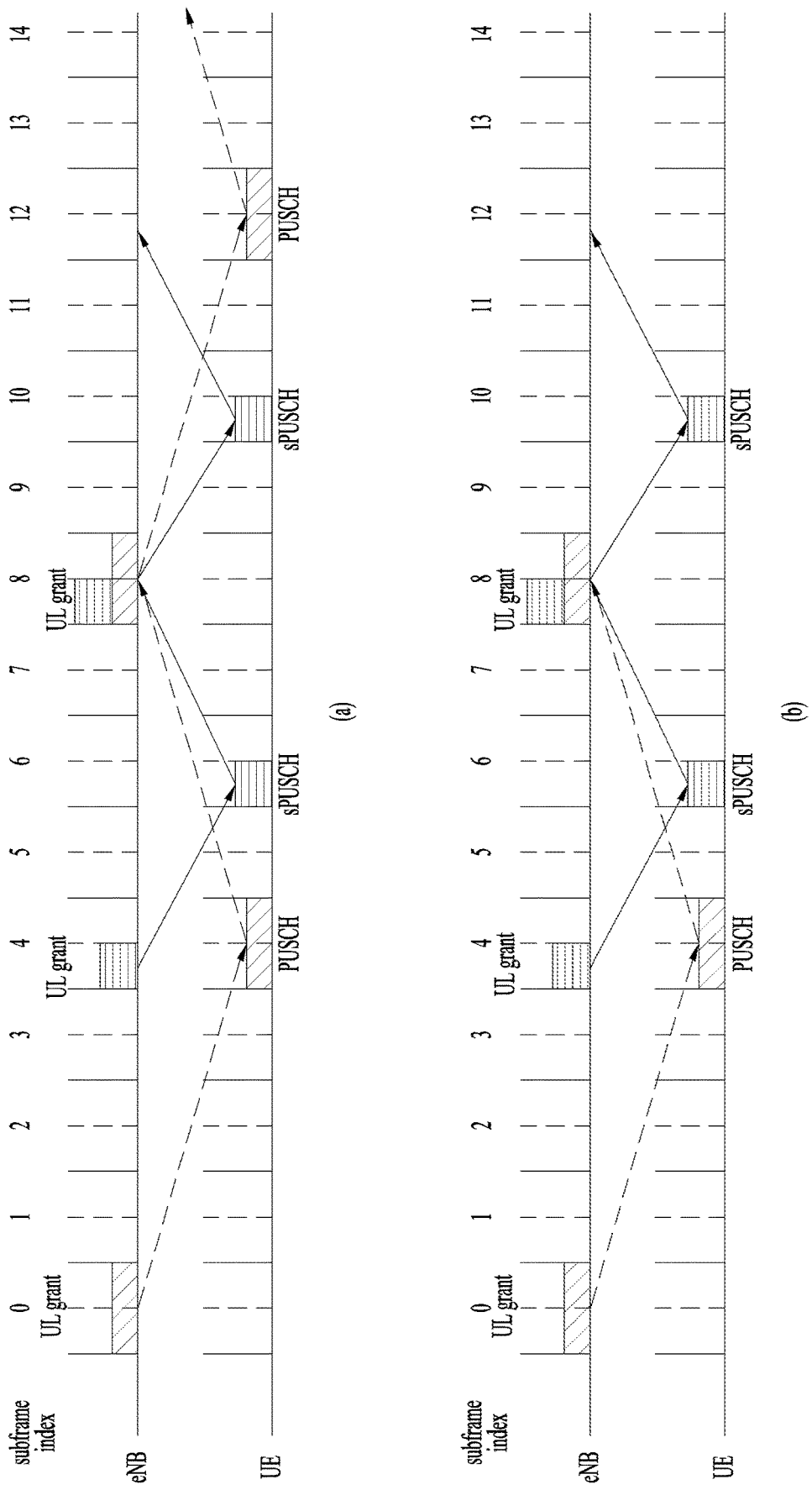
FIG. 14 illustrates UL HARQ transmission timing according to the present invention.

FIG. 14 illustrates UL HARQ transmission timing according to the present invention.

Referring to FIG. 14(a), in dynamic UL HARQ, sPUSCH and PHICH for PUSCH may be transmitted at the same subframe. Also, the eNB may transmit UL grant for retransmission. In view of the UE which has received the UL grant, it may be ambiguous whether the UL grant for retransmission is for either sPUSCH which is previously transmitted or normal TTI PUSCH which is previously transmitted. Therefore, to avoid this confusion, retransmission for sPUSCH transmitted with a short TTI length is performed with the short TTI length. Likewise, retransmission for PUSCH transmitted with a normal TTI length is transmitted with the normal TTI length. That is, the TTI length applied to initial transmission is also applied to retransmission.

The UE which has received UL grant for retransmission retransmits PUSCH with a corresponding TTI length in accordance with TTI length information within the UL grant. Referring to FIG. 4(a), if TTI length information within DCI of retransmission UL grant received at a subframe 8 indicates a short TTI length, the UE retransmits sPUSCH, which has transmitted at a first slot of a subframe 6, at a fourth slot timing immediately after the subframe n, that is, at a first slot of subframe 10, in accordance with the grant. If the UL grant received by the UE indicates a normal TTI length or does not include separate TTI length information, the UE performs retransmission for PUSCH transmitted at a subframe 4, at a subframe 8 in accordance with UL grant transmitted at a subframe 0.

Likewise, even in the TDD system, the TTI length used for initial transmission is used for (s)PUSCH transmission and retransmission started by UL grant which has commanded transmission of (s)PUSCH. That is, if initial transmission of sPUSCH is scheduled by UL grant, retransmission for the sPUSCH is also performed with short TTI. The UE which has received UL grant for normal TTI PUSCH performs retransmission for the PUSCH with normal TTI.

Referring to FIG. 14(b), if the eNB transmits PHICH ACK for PUSCH and UL grant for sPUSCH at a subframe 8, and if the UL grant includes information indicating that sPUSCH is transmitted with short TTI, as shown in FIG. 14(b), the UE performs retransmission for sPUSCH transmitted at a slot prior to 4 slots from the subframe 8, that is, a first slot of a subframe 6. Since ACK has been received for the PUSCH, the UE empties data of the PUSCH from the buffer and regards that the PUSCH transmission is completed.

If TTIs of different lengths are supported within one system, HARQ processes may be used by being appropriately divided among the TTIs of different lengths. In the current LTE system, 8 HARQ processes are assumed and a soft buffer is assumed per process, whereby data transmission/retransmission is performed. That is, in the current LTE system, one UE may transmit/receive its data at 8 consecutive subframes in a state that A/N is not received. However, if short TTI is supported, 8 HARQ processes are additionally required unless the legacy data scheduling and data transmission and A/N transmission timing therefor are corrected. Since A/N reception timing for the data transmission after data transmission is varied depending on the TTI length, it is preferable that the HARQ processes are used by being divided per TTL length. For example, normal TTI length and one short TTI length coexist in the system, the HARQ processes 0 to 7 may be used for normal TTI, and the HARQ processes 8 to 15 may be used for short TTI. That is, each HARQ process number is dedicated for a specific TTI length, and may not be shared for short TTI and normal TTI. In the same manner that HARQ process for normal TTI and HARQ process for short TTI are identified from each other, soft buffers for the corresponding HARQ processes may be managed by being identified from each other. At this time, sizes of the soft buffers may be determined depending on the TTI length. The shorter the TTI length is, the smaller the soft buffer size is, and the longer the TTI length, the greater the soft buffer size is.

If a subframe corresponding to a transmission timing of PHICH or UL grant for sPUSCH is not configured as MBSFN subframe, the PHICH or UL grant for sPUSCH may be transmitted at the subframe. PHICH or UL grant for PUSCH transmitted with normal TTI of 1 ms may be transmitted even at the MBSFN subframe. First and second OFDM symbols of the MBSFN subframe correspond to a duration where PDCCH may be transmitted and actual MBMS data are transmitted from symbols after the first and second OFDM symbols. Therefore, A/N for PUSCH is not limited by MBSFN subframe configuration. Unlike this, if the timing when A/N for sPUSCH configured with short TTI should be transmitted is overlapped with the timing when MBMS is transmitted at the MBSFN subframe, other control information as well as the A/N for the sPUSCH cannot be transmitted. For example, in case of 0.5 ms TTI, if the A/N for sPUSCH should be transmitted at the first slot of the MBSFN subframe, the A/N for the sPUSCH may be transmitted. However, if the A/N for sPUSCH should be transmitted at the second slot of the MBSFN subframe, the A/N for the sPUSCH cannot be transmitted. It is ambiguous how the UE which has not received A/N for (s)PUSCH transmitted by the UE should be operated. In this case, although the UE may be allowed to wait for A/N until the eNB can transmit A/N, problems may occur in that collision may occur between PHICH resources and latency of the UE which uses short TTI may be increased. Therefore, if the eNB is not able to transmit A/N for an uplink channel transmitted from the UE at the time when the A/N for the uplink channel should be received, it is required that the corresponding UE should previously know this fact. The time when the UE should receive the A/N for sPUSCH after transmitting the sPUSCH corresponds to the time when A/N transmission from the eNB is not possible, the UE may understand non-A/N reception at the corresponding timing as NACK and then perform retransmission. For example, the UE which has received MBSFN configuration information transmitted from the eNB may figure out the timing when the A/N for sPUSCH transmitted by the UE cannot be transmitted by the eNB. The timing when the eNB cannot transmit the A/N for sPUSCH/PUSCH will be referred to as a non-A/N timing. If A/N should be received at the non-A/N timing, the UE assumes this as NACK and then performs retransmission.

The aforementioned embodiments of the present invention are not limited to FDD, and are applicable to a TDD system.

Figure 15:
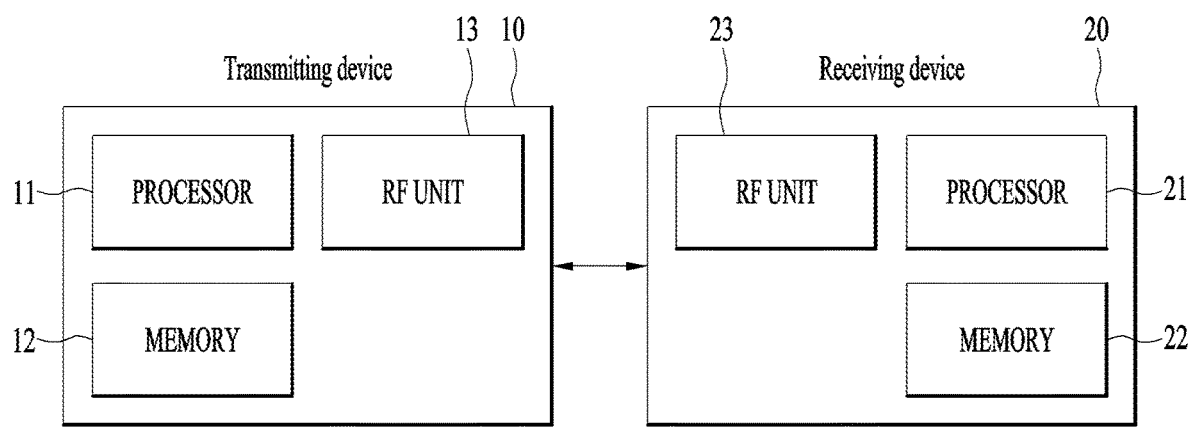
FIG. 15 is a block diagram illustrating elements of a transmitting device 10 and a receiving device 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor and the UE processor of the present invention are configured to allocate/decode signals within short TTI configured to be shorter than the existing TTI. The short TTI may be comprised of some OFDM symbols within the existing TTI. Since the short ITT is configured within the existing TTI, signals transmitted/received based on the existing TTI and signals transmitted/received based on the short TTI may occur simultaneously in a time domain.

The eNB processor of the present invention may control the eNB RF unit to receive UE capability information transmitted from the UE in accordance with at least one of the embodiments suggested in the sections A and B. The eNB processor may control the eNB RF unit to configure TTI different from default TTI and transmit corresponding configuration information to the UE on the basis of the UE capability information. The eNB processor may be configured to schedule a downlink channel of a default TTI length and/or a downlink channel of the different TTI length on the basis of the UE capability information. The eNB processor may control the eNB RF unit to transmit the downlink channel of the default TTI length and/or the downlink channel of the different TTI length on the basis of the UE capability information. The eNB processor may be configured to schedule an uplink channel of a default TTI length and/or an uplink channel of the different TTI length on the basis of the UE capability information. The eNB processor may control the eNB RF unit to receive the uplink channel of the default Ill length and/or the uplink channel of the different TTI length on the basis of the UE capability information. The eNB processor may control the eNB RF unit to simultaneously or continuously transmit downlink channels of different TTI lengths in accordance with at least one of the embodiments suggested in the sections A and B. The eNB processor may control the eNB RF unit to simultaneously or continuously receive uplink channels of different TTI lengths in accordance with at least one of the embodiments suggested in the sections A and B. The eNB processor may determine a TTI length of a downlink channel to which A/N received by the eNB RF unit relates, in accordance with at least one of the embodiments of the present invention. The eNB processor may control the eNB RF unit to transmit PHICH carrying A/N for an uplink channel or UL grant in accordance with at least one of the embodiments of the present invention.

The UE processor of the present invention may control the UE RF unit to transmit its UE capability information in accordance with at least one of the embodiments suggested in the sections A and B. The UE processor may control the UE RF unit to receive configuration information for configuring TTI different from default TTI. The UE processor may control the UE RF unit to receive a downlink channel of a default TTI length and DL grant(s) for scheduling a downlink channel of the different TTI length. The UE processor may control the UE RF unit to receive a downlink channel of a default m length and/or a downlink channel of the different TTI length. The UE processor may control the UE RF unit to receive an uplink channel of a default TTI length and/or UL grant(s) for scheduling an uplink channel of the different TTI length. The UE processor may control the UE RF unit to transmit the uplink channel of the default TTI length and/or the uplink channel of the different TTI length. The UE processor may control the UE RF unit to simultaneously or continuously receive downlink channels of different TTI lengths in accordance with at least one of the embodiments suggested in the sections A and B. The UE processor may decode downlink channel(s) in accordance with one embodiment of the present invention. The UE processor may control the UE RF unit to transmit A/N of the received downlink channel(s). The UE processor may control the UE RF unit to simultaneously or continuously transmit uplink channels of different TTI lengths in accordance with at least one of the embodiments suggested in the sections A and B. The UE processor may control the UE RF unit to receive PHICH carrying A/N for an uplink channel or UL grant in accordance with at least one of the embodiments of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving a downlink channel in a user equipment of a wireless communication system, the method comprising:
   receiving a first physical downlink control channel (PDCCH) associated with a first physical downlink shared channel (PDSCH) of a first transmission time interval (TTI) and a second PDCCH associated with a second PDSCH of a second TTI configured in the first TTI; and
   decoding the second PDSCH not the first PDSCH in the first TTI, in a state in which the user equipment is unable to decode the first PDSCH and the second PDSCH in a same TTI,
   wherein the first TTI has a first TTI length in a time domain, and
   wherein the second TTI has a second TTI length shorter than the first TTI length.

2. The method according to claim 1, further comprising:
   skipping decoding the first PDSCH based on receiving the second PDSCH while the user equipment is receiving the first PDSCH.

3. The method according to claim 1, further comprising:
   transmitting negative acknowledgement (NACK) indicating that the first PDSCH is not successfully decoded.

4. The method according to claim 3, further comprising:
   receiving a third PDCCH having no corresponding PDSCH in response to the NACK for the first PDSCH;
   decoding the first PDSCH after completing decoding the second PDSCH; and
   transmitting acknowledgement (ACK) or NACK as ACK/NACK information for the first PDSCH at an ACK/NACK timing associated with the third PDCCH in accordance with decoding result of the first PDSCH.

5. The method according to claim 4, wherein the ACK/NACK information for the first PDSCH is transmitted using a physical uplink control channel (PUCCH) resource determined based on a lowest control channel element (CCE) index of the third PDCCH.

6. The method according to claim 4, wherein the third PDCCH carries downlink control information, which includes the same scheduling information as scheduling information carried by the first PDCCH, or downlink control information having no scheduling information.

7. The method according to claim 1, further comprising:
   transmitting ACK or NACK for the second PDSCH in accordance with decoding result of the second PDSCH.

8. The method according to claim 1, further comprising:
   transmitting capability information including information regarding whether the user equipment is able to decode a first length TTI length based PDSCH and a second TTI length based PDSCH simultaneously.

9. A user equipment for receiving a downlink channel in a wireless communication system, the user equipment comprising:
   a transceiver;
   a processor; and
   a computer memory that is operably connectable to the processor and that has stored thereon instructions which, when executed, cause the processor to perform operations comprising:
   receiving, via the transceiver, a first physical downlink control channel (PDCCH) associated with a first physical downlink shared channel (PDSCH) of a first transmission time interval (TTI) and a second PDCCH associated with a second PDSCH of a second TTI configured in the first TTI; and
   decode the second PDSCH not the first PDSCH in the first TTI, in the state in which the user equipment is unable to decode the first PDSCH and the second PDSCH in a same TTI,
   wherein the first TTI has a first TTI length in a time domain, and
   wherein the second TTI has a second TTI length shorter than the first TTI length in the time domain.

10. The user equipment according to claim 9, wherein the operations further comprise:
    skipping decoding the first PDSCH based on receiving the second PDSCH while the user equipment is receiving the first PDSCH.

11. The user equipment according to claim 9, wherein the operations further comprise:
    transmitting, via the transceiver, negative acknowledgement (NACK) indicating that the first PDSCH is not successfully decoded.

12. The user equipment according to claim 11, wherein the operations further comprise:
    receiving, via the transceiver, a third PDCCH having no corresponding PDSCH in response to the NACK for the first PDSCH;
    decoding the first PDSCH after completing decoding the second PDSCH; and control the transceiver to transmit acknowledgement (ACK) or NACK as ACK/NACK information for the first PDSCH at an ACK/NACK timing associated with the third PDCCH in accordance with decoding result of the first PDSCH.

13. The user equipment according to claim 12, wherein the operations further comprise:
    transmitting, via the transceiver, the ACK/NACK information for the first PDSCH using a physical uplink control channel (PUCCH) resource determined based on a lowest control channel element (CCE) index of the third PDCCH.

14. The user equipment according to claim 12, wherein the third PDCCH carries downlink control information, which includes the same scheduling information as scheduling information carried by the first PDCCH, or downlink control information having no scheduling information.

15. The user equipment according to claim 9, wherein the operations further comprise:
    transmitting, via the transceiver, capability information including information regarding whether the user equipment is capable of decoding a first TTI length based PDSCH and a second TTI length based PDSCH simultaneously.

* * * * *